(12) United States Patent
Satterthwaite

(10) Patent No.: US 10,596,850 B2
(45) Date of Patent: *Mar. 24, 2020

(54) RIM STRIP FOR BICYCLE RIM

(71) Applicant: ENVE Composites, LLC, Ogden, UT (US)

(72) Inventor: Brett Satterthwaite, Ogden, UT (US)

(73) Assignee: ENVE Composites, LLC, Ogden, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/001,312

(22) Filed: Jun. 6, 2018

(65) Prior Publication Data

US 2018/0281514 A1    Oct. 4, 2018

Related U.S. Application Data

(63) Continuation-in-part of application No. 14/960,889, filed on Dec. 7, 2015, now Pat. No. 10,052,911.

(51) Int. Cl.
*B60B 21/12* (2006.01)
*B60B 21/04* (2006.01)
(Continued)

(52) U.S. Cl.
CPC ............ *B60B 21/12* (2013.01); *B60B 21/025* (2013.01); *B60B 21/04* (2013.01); *B60B 21/102* (2013.01);
(Continued)

(58) Field of Classification Search
CPC ..... B60B 21/12; B60B 21/026; B60B 21/025; B60B 21/102; B60B 21/04; B60B 21/10; B60C 15/0206
See application file for complete search history.

(56) References Cited

U.S. PATENT DOCUMENTS 2,087,228 A * 7/1937 Ashworth ............... B60B 21/12
152/501
2,709,472 A   5/1955 Hofweber
(Continued)

FOREIGN PATENT DOCUMENTS

CN   2447196 Y   9/2001
EP   2316663 B1  5/2011
(Continued)

OTHER PUBLICATIONS

International Patent Application PCT/US2016/065256 International Preliminary Report on Patentability dated Jun. 21, 2018. 17 pages.
(Continued)

*Primary Examiner* — Scott A Browne
(74) *Attorney, Agent, or Firm* — Woodard, Emhardt, Henry, Reeves & Wagner, LLP

(57) ABSTRACT

A bicycle rim has rim a pair of rim flanges that defines a tire channel. A rim strip extends across the tire channel. The rim strip includes a pair of flange bumpers configured to cover the rim flanges. The flange bumpers each define a flange channel in which one of the rim flanges is received. A pair of safety humps define corresponding tire seating sections where a tire is seated when inflated. The rim strip further includes a drop seal that seals with the beads of the tire to facilitate seating of the tire during inflation.

20 Claims, 12 Drawing Sheets

(51) Int. Cl.
*B60B 21/02* (2006.01)
*B60B 21/10* (2006.01)
*B60S 5/04* (2006.01)

(52) U.S. Cl.
CPC ... *B60B 2900/212* (2013.01); *B60B 2900/523* (2013.01); *B60B 2900/541* (2013.01); *B60S 5/04* (2013.01); *B60Y 2200/13* (2013.01)

(56) References Cited

U.S. PATENT DOCUMENTS

| | | | |
|---|---|---|---|
| 2,787,312 A | 4/1957 | Servaes | |
| 2,937,905 A | 5/1960 | Altenburger | |
| 3,077,219 A | 2/1963 | Solomon | |
| 3,335,778 A * | 8/1967 | Blagden | B60B 21/062 152/513 |
| 4,108,232 A | 8/1978 | Simpson | |
| 4,164,250 A | 8/1979 | Shichman | |
| 4,930,558 A * | 6/1990 | Sahagian | B60B 21/10 152/339.1 |
| 5,538,058 A | 7/1996 | Aloy | |
| 5,820,709 A * | 10/1998 | Matsuda | B60B 21/10 152/501 |
| 6,019,149 A | 2/2000 | Stringer | |
| 6,209,601 B1 | 4/2001 | Mark | |
| 6,237,662 B1 | 5/2001 | Thomasberg | |
| 6,257,676 B1 * | 7/2001 | Lacombe | B60B 1/003 301/58 |
| 7,104,300 B2 | 9/2006 | Veux et al. | |
| 7,464,994 B2 | 12/2008 | Okajima et al. | |
| 8,444,155 B2 | 5/2013 | Gilbert | |
| 8,544,514 B2 * | 10/2013 | Gangloff | B60B 21/025 152/381.6 |
| 8,905,491 B2 | 12/2014 | Koshiyama | |
| 9,440,498 B2 | 9/2016 | Teixeira | |
| 9,597,926 B1 | 3/2017 | Hed et al. | |
| 10,052,911 B2 * | 8/2018 | Satterthwaite | B60C 15/0209 |
| 2004/0095014 A1 * | 5/2004 | Veux | B60B 21/025 301/58 |
| 2005/0210675 A1 * | 9/2005 | Price | B60B 21/025 29/894.31 |
| 2006/0108041 A1 * | 5/2006 | Schelhaas | B60B 1/041 152/381.6 |
| 2008/0006358 A1 | 1/2008 | Tavin et al. | |
| 2009/0301626 A1 | 12/2009 | Gilbert | |
| 2011/0121637 A1 | 5/2011 | Gangloff et al. | |
| 2011/0266863 A1 * | 11/2011 | Gittani | B60B 1/047 301/58 |
| 2015/0054333 A1 | 2/2015 | Chen | |
| 2015/0224820 A1 * | 8/2015 | Teixeira | B60C 15/0209 152/514 |
| 2017/0157981 A1 | 6/2017 | Satterthwaite | |

FOREIGN PATENT DOCUMENTS

| | | | |
|---|---|---|---|
| GB | 846016 A * | 8/1960 | B60C 5/16 |
| GB | 846016 A | 8/1960 | |
| WO | 2016015617 A1 | 2/2016 | |

OTHER PUBLICATIONS

International Patent Application PCT/US2016/065256 International Search Report and Written Opinion dated Mar. 16, 2017. 17 pages.
European Patent Application No. 16873706.2 Extended Search Report dated Apr. 16, 2019. 10 pages.
European Patent Application 19178683.9 Extended Search Report dated Nov. 12, 2019. 8 pages.

* cited by examiner

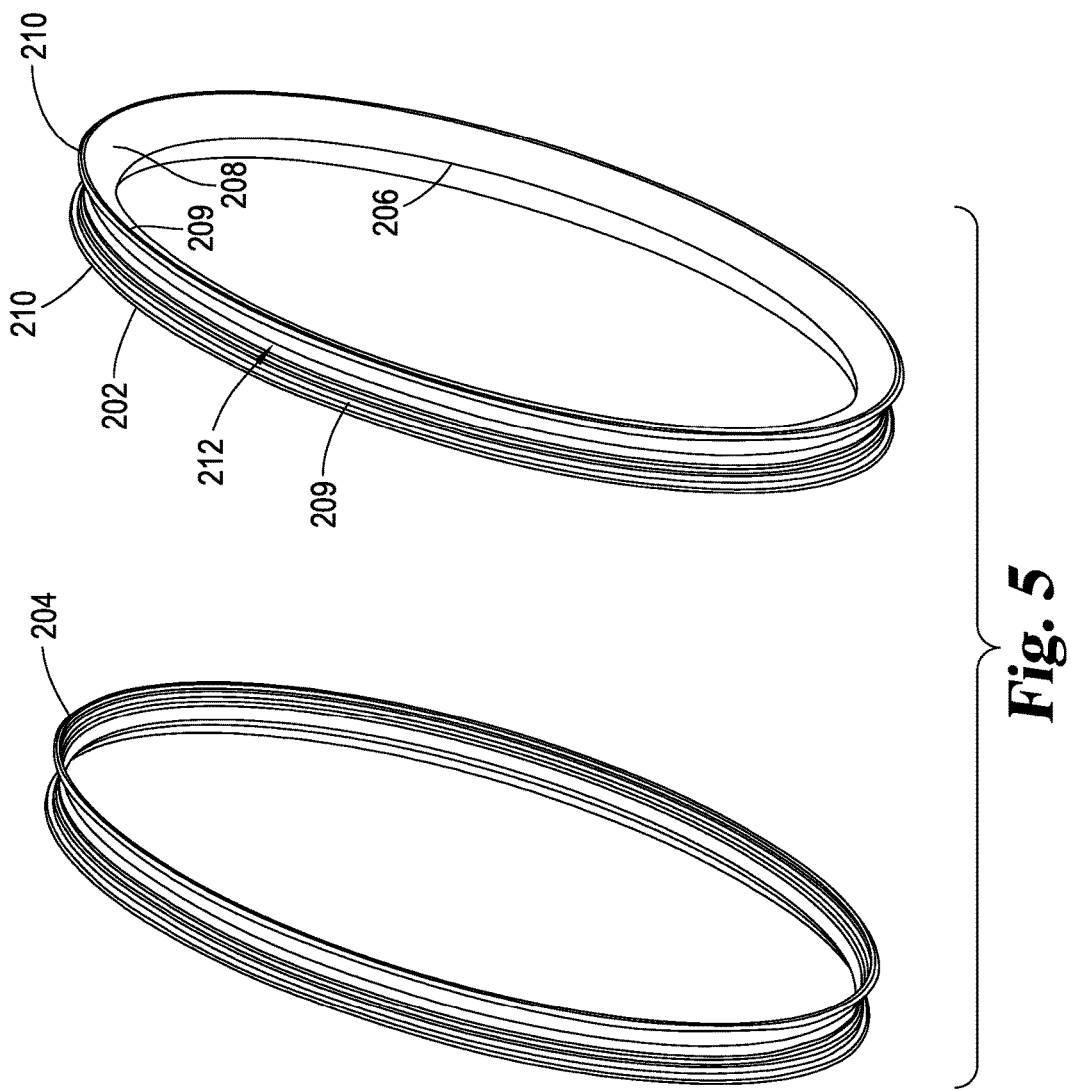
Fig. 5
Fig. 4

RIM STRIP FOR BICYCLE RIM

CROSS-REFERENCE TO RELATED APPLICATION

This application is a continuation-in-part of U.S. patent application Ser. No. 14/960,889 filed Dec. 7, 2015, which is hereby incorporated by reference.

BACKGROUND

As many riders have experienced, having a bicycle wheel hit a rock, pothole, or other obstruction can cause the tire to pinch which can result in a flat tire. Field repair of a flat tire, such as on the side of a road or trail, can be difficult, and the time it can take to make the repair can be the difference between winning or losing a race, or even getting home in time for a meal or appointment. With the advent of composite rims, such as carbon fiber rims, any impact can lead to rim failure, and even visually minor cracks or other damage can propagate in composite rims and lead to catastrophic failure.

To enhance bike performance and tire traction, some competitive riders have recently favored tubeless tires, but there are some notable drawbacks. For example, flat tubeless tires can be very difficult to repair or replace, especially on the side of a road or trail. During mounting, air being pumped inside the tire can readily leak because the tire beads are not yet properly seated and sealed with the rim. With this air leakage, conventional pumps, such as floor pumps, foot pumps, hand pumps, and the like, typically are unable to provide enough high pressure and/or large volumes of air (or other gas) in a rapid fashion so as to create sufficient pressure to push the sidewalls of the tire in an outwards direction so as to seat tubeless tires. These pumps lack sufficient pump throughput to overcome the leakage rate from the tire in order to create enough pressure or force on the tire sidewalls to seat the tire beads.

Consequently, tubeless tire setups have to be aired up or inflated initially with a blast of air typically from a compressor or $CO_2$ cartridge in order to seat the beads of the tire. This blast of air provides a high pressured, large volume air or other gas in a rapid fashion to the interior of the tire which in turn causes the sidewalls of the tire to spread apart until the tire beads are seated in the rim. Once the tire beads are seated, a proper seal is formed between the tire and rim that allows the tire to be inflated in a conventional manner. Some floor pumps with high pressure tanks have been proposed for providing this blast of air, but this expensive and complicated solution still does not address the underlying issue. Moreover, these specialized floor pumps with high pressure tanks and compressors are not usually available when they are needed most, that is, during a ride. Thus, there is a need for improvement in this field.

SUMMARY

The proposed design for an impact resistant rim assembly is configured to soften or minimize the impact, thereby reducing the risk of pinching or otherwise flattening of the tire. In this design, a rim strip or band made of an elastomer material, such as rubber and/or silicone, is wrapped around the outer periphery of the rim. The rim strip/bumper wraps around both leading edges of the rim and continues within the channel of the rim. Not only does this design minimize the effects of an impact of the rim and provide pinched flat protection for the tire, it also provides a means to seal the wheel for a tubeless tire set up such that the tire can be reseated and inflated with a conventional floor pump, hand pump, and the like.

Aspect 1 concerns an apparatus, comprising a bicycle rim having a pair of rim flanges that define a tire channel; and a rim strip extending across the tire channel, the rim strip including a pair of rim flange bumpers configured to cover the rim flanges, wherein the rim flange bumpers each define a flange channel in which one of the rim flanges is received.

Aspect 2 concerns the apparatus of aspect 1, wherein the rim includes a rim drop inside the tire channel; and the rim strip includes a drop section covering the rim drop.

Aspect 3 concerns the apparatus of aspect 2, wherein the drop section includes a drop seal configured to contact beads of the tire at a position at least over the rim drop during mounting of the tire.

Aspect 4 concerns the apparatus of aspect 3, wherein the drop seal is biased to bow away from the rim drop.

Aspect 5 concerns the apparatus of aspect 4, wherein the rim strip includes a pair of safety humps defining corresponding tire seating sections where a tire is seated when inflated, the safety humps each including a ramp section that is angled at an acute angle to facilitate sliding of the beads of the tire over when the drop seal bows away from the rim drop.

Aspect 6 concerns the apparatus of aspect 5, wherein the drop seal is configured to contact the rim drop when the tire at least reaches an internal pressure where the tire is seated in the rim.

Aspect 7 concerns the apparatus of aspect 6, wherein the internal pressure when the drop seal contacts the rim drop is at least 15 pounds per square inch.

Aspect 8 concerns the apparatus of aspect 1, wherein the bumpers have a height greater than or equal to the height of the rim flanges.

Aspect 9 concerns the apparatus of aspect 1, wherein the rim flanges have channel walls that are flat; and the bumpers have channel walls that are flat.

Aspect 10 concerns the apparatus of aspect 1, wherein the bumpers each include an outer buffer covering the rim flange outside of the tire channel.

Aspect 11 concerns the apparatus of aspect 1, wherein the rim is composed of composite material; and the rim flange is composed of elastomeric material.

Aspect 12 concerns the apparatus of aspect 1, wherein the rim strip includes
a pair of safety humps defining corresponding tire seating sections where a tire is seated when inflated.

Aspect 13 concerns the apparatus of aspect 1, wherein at least one of the bumpers has an outer buffer with a hook end that defines the flange channel; the hook end has a rim hook width; the at least one bumper has a bumper width; and a ratio of the rim hook width to bumper width is from 0.30 to 0.60.

Aspect 14 concerns the apparatus of aspect 1, wherein the rim strip has an inner wall thickness;
at least one of the bumpers has a bumper width; and a ratio of the inner wall thickness to bumper width is from 0.20 to 0.50.

Aspect 15 concerns the apparatus of aspect 1, wherein at least one of the bumpers has an outer buffer with a hook end that defines the flange channel; the at least one bumper has a bumper height; the hook end has a hook wall height; and a ratio of the bumper height to hook wall height 638 is from 0.50 to 1.20.

Aspect 16 concerns the apparatus of aspect 1, further comprising the tire seated in the rim.

Aspect 17 concerns an apparatus, comprising a bicycle rim defining a rim drop; and a drop seal disposed at the rim drop, the drop seal being configured to seal with a bead of a tire when the bead is positioned at the rim drop.

Aspect 18 concerns the apparatus of aspect 17, wherein the drop seal is biased away from the rim drop to seal with the bead of the tire.

Aspect 19 concerns the apparatus of aspect 18, wherein the drop seal has a bowed shaped when biased from the rim drop.

Aspect 20 concerns the apparatus of aspect 17, wherein the drop seal is configured to collapse into the rim drop when the tire reaches a specified pressure.

Aspect 21 concerns the apparatus of aspect 20, wherein the specified pressure is where at least the tire is expanded to where the bead is moved outside of the rim drop during inflation.

Aspect 22 concerns the apparatus of aspect 21, wherein the specified pressure is where at least the tire is expanded to where the bead is seated in the rim.

Aspect 23 concerns the apparatus of aspect 17, wherein the specified pressure is at least 15 pounds per square inch.

Aspect 24 concerns the apparatus of aspect 17, further comprising a rim strip that includes the drop seal.

Aspect 25 concerns the apparatus of aspect 24, wherein the rim strip includes a safety hump that defines a seating section configured to seat the bead of the tire.

Aspect 26 concerns the apparatus of aspect 25, wherein the safety hump includes a ramp section that is angled at an acute angle to facilitate sliding of the bead of the tire over the safety hump when the drop seal is sealed seals with the bead of the tire.

Aspect 27 concerns the apparatus of aspect 17, wherein the rim drop has a generally rectangular cross-sectional shape.

Aspect 28 concerns the apparatus of aspect 24, wherein the rim strip is made of one or more materials having a hardness from Shore 80 A to 70 D.

Aspect 29 concerns a method, comprising pressing a bead of a tire against a drop seal that is biased to seal against the bead over a drop channel of a bicycle rim; inflating the tire to cause the bead of the tire to slide along the drop seal in a direction away from the drop channel; and seating the bead of the tire in a seating section of the rim as a result of said inflating.

Aspect 30 concerns the method of aspect 29, further comprising collapsing the drop seal against the drop channel of the rim when the bead of the tire clears the drop channel during said inflating.

Aspect 31 concerns the apparatus of any preceding aspect, wherein the rim includes a rim drop inside the tire channel; and the rim strip includes a drop section covering the rim drop.

Aspect 32 concerns the apparatus of any preceding aspect, wherein the drop section includes a drop seal configured to contact beads of the tire at a position at least over the rim drop during mounting of the tire.

Aspect 33 concerns the apparatus of any preceding aspect, wherein the drop seal is biased to bow away from the rim drop.

Aspect 34 concerns the apparatus of any preceding aspect, wherein the rim strip includes a pair of safety humps defining corresponding tire seating sections where a tire is seated when inflated, the safety humps each including a ramp section that is angled at an acute angle to facilitate sliding of the beads of the tire over when the drop seal bows away from the rim drop.

Aspect 35 concerns the apparatus of any preceding aspect, wherein the drop seal is configured to contact the rim drop when the tire at least reaches an internal pressure where the tire is seated in the seating sections.

Aspect 36 concerns the apparatus of any preceding aspect, wherein the internal pressure when the drop seal contacts the rim drop is at least 15 pounds per square inch.

Aspect 37 concerns the apparatus of any preceding aspect, wherein the bumpers have a height greater than or equal to the height of the rim flanges.

Aspect 38 concerns the apparatus of any preceding aspect, wherein the rim flanges have channel walls that are flat; and the flange bumpers have channel walls that are flat concerns the Aspect 39 concerns the apparatus of any preceding aspect, wherein the rim bumpers each include an outer buffer covering the rim flange outside of the tire channel.

Aspect 40 concerns the apparatus of any preceding aspect, wherein the rim is composed of composite material; and the rim flange is composed of elastomeric material.

Aspect 41 concerns the apparatus of any preceding aspect, wherein the rim strip includes a pair of safety humps defining corresponding tire seating sections where a tire is seated when inflated.

Aspect 42 concerns the apparatus of any preceding aspect, wherein at least one of the bumpers has an outer buffer with a hook end that defines the flange channel; the hook end has a rim hook width; the at least one bumper has a bumper width; and a ratio of the rim hook width to bumper width is from 0.30 to 0.60.

Aspect 43 concerns the apparatus of any preceding aspect, wherein the rim strip has an inner wall thickness; at least one of the bumpers has a bumper width; and a ratio of the inner wall thickness to bumper width is from 0.20 to 0.50.

Aspect 44 concerns the apparatus of any preceding aspect, wherein at least one of the bumpers has an outer buffer with a hook end that defines the flange channel; the at least one bumper has a bumper height; the hook end has a hook wall height; and a ratio of the bumper height to hook wall height 638 is from 0.50 to 1.20.

Aspect 45 concerns the apparatus of any preceding aspect, further comprising the tire seated in the seating sections.

Aspect 46 concerns the apparatus of any preceding aspect, wherein the drop seal has a bowed shaped when biased from the rim drop.

Aspect 47 concerns the apparatus of any preceding aspect, wherein the drop seal is configured to collapse into the rim drop when the tire reaches a specified pressure.

Aspect 48 concerns the apparatus of any preceding aspect, wherein the specified pressure is where at least the tire is expanded to where the bead is moved outside of the rim drop during inflation.

Aspect 49 concerns the apparatus of any preceding aspect, wherein the specified pressure is where at least the tire is expanded to where the bead is seated in the rim.

Aspect 50 concerns the apparatus of any preceding aspect, wherein the specified pressure is at least 15 pounds per square inch.

Aspect 51 concerns the apparatus of any preceding aspect, further comprising a rim strip that includes the drop seal.

Aspect 52 concerns the apparatus of any preceding aspect, wherein the rim strip includes a safety hump that defines a seating section configured to seat the bead of the tire.

Aspect 53 concerns the apparatus of any preceding aspect, wherein the safety hump includes a ramp section that is angled at an acute angle to facilitate sliding of the bead of the tire over the safety hump when the drop seal is sealed seals with the bead of the tire.

Aspect 54 concerns the apparatus of any preceding aspect, wherein the rim drop has a generally rectangular cross-sectional shape.

Aspect 55 concerns the apparatus of any preceding aspect, wherein the rim strip is made of one or more materials having a hardness from Shore 80 A to 70 D.

Aspect 56 concerns a method of seating the tire for the apparatus of any preceding aspect.

Further forms, objects, features, aspects, benefits, advantages, and embodiments of the present invention will become apparent from a detailed description and drawings provided herewith.

BRIEF DESCRIPTION OF THE DRAWINGS

FIG. 4 is an end view of the FIG. 2 rim assembly.

FIG. 5 is an exploded view of the FIG. 2 rim assembly.

DESCRIPTION OF THE SELECTED EMBODIMENTS

Figure 1:
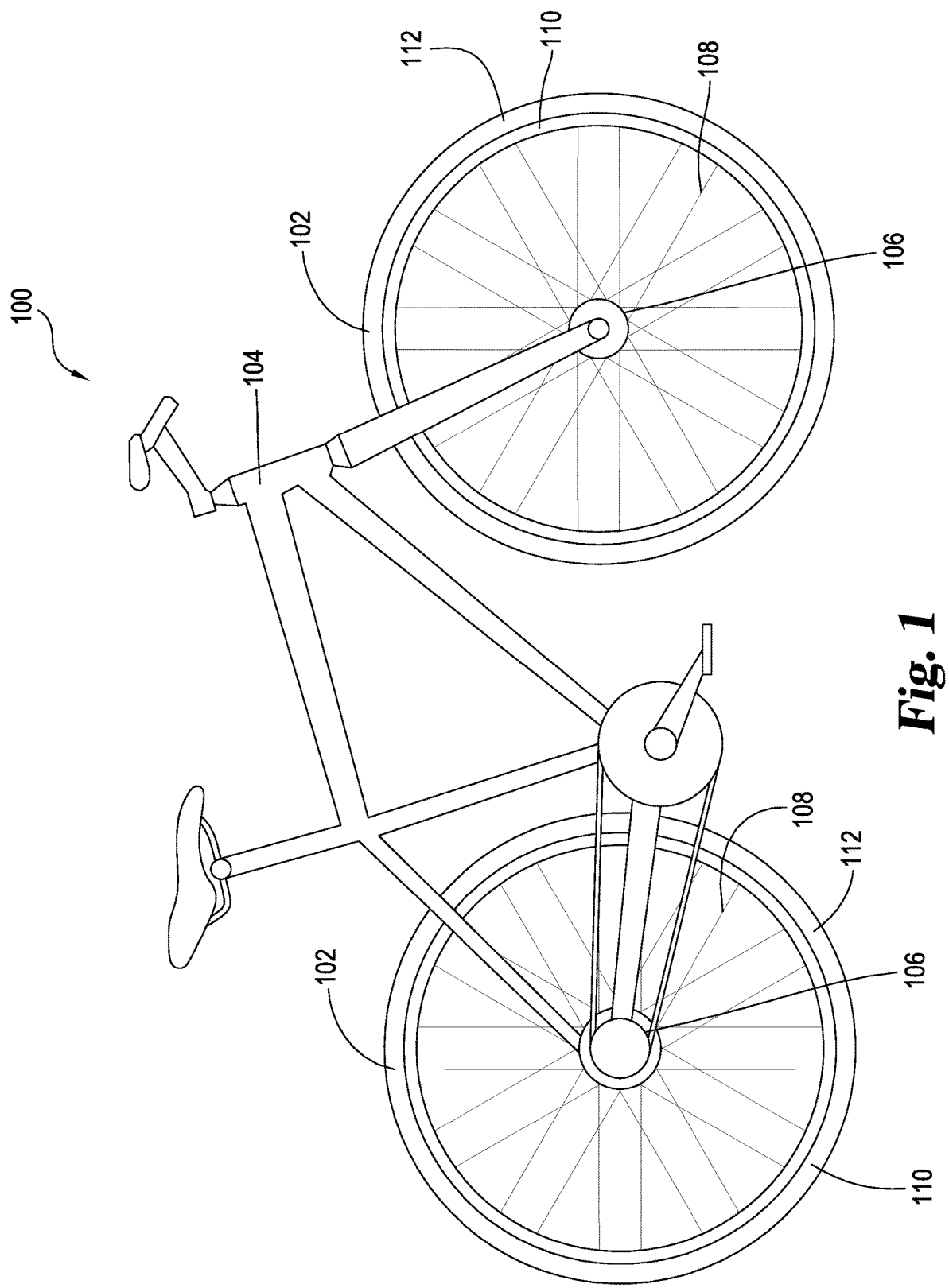
FIG. 1 is a side view of a bicycle having wheels.
Figure 2:
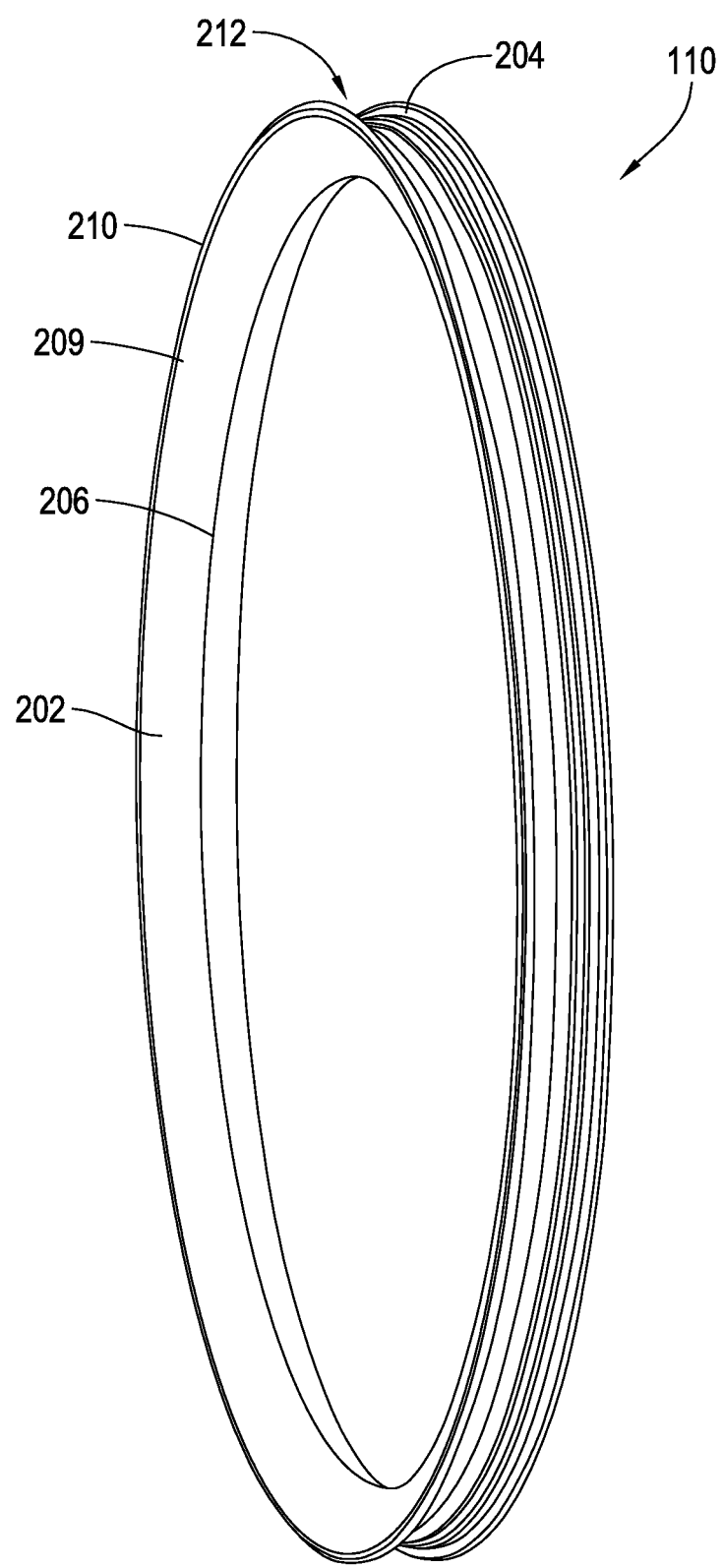
FIG. 2 is a perspective view of the rim assembly found in the wheels shown in FIG. 1.
Figure 3:
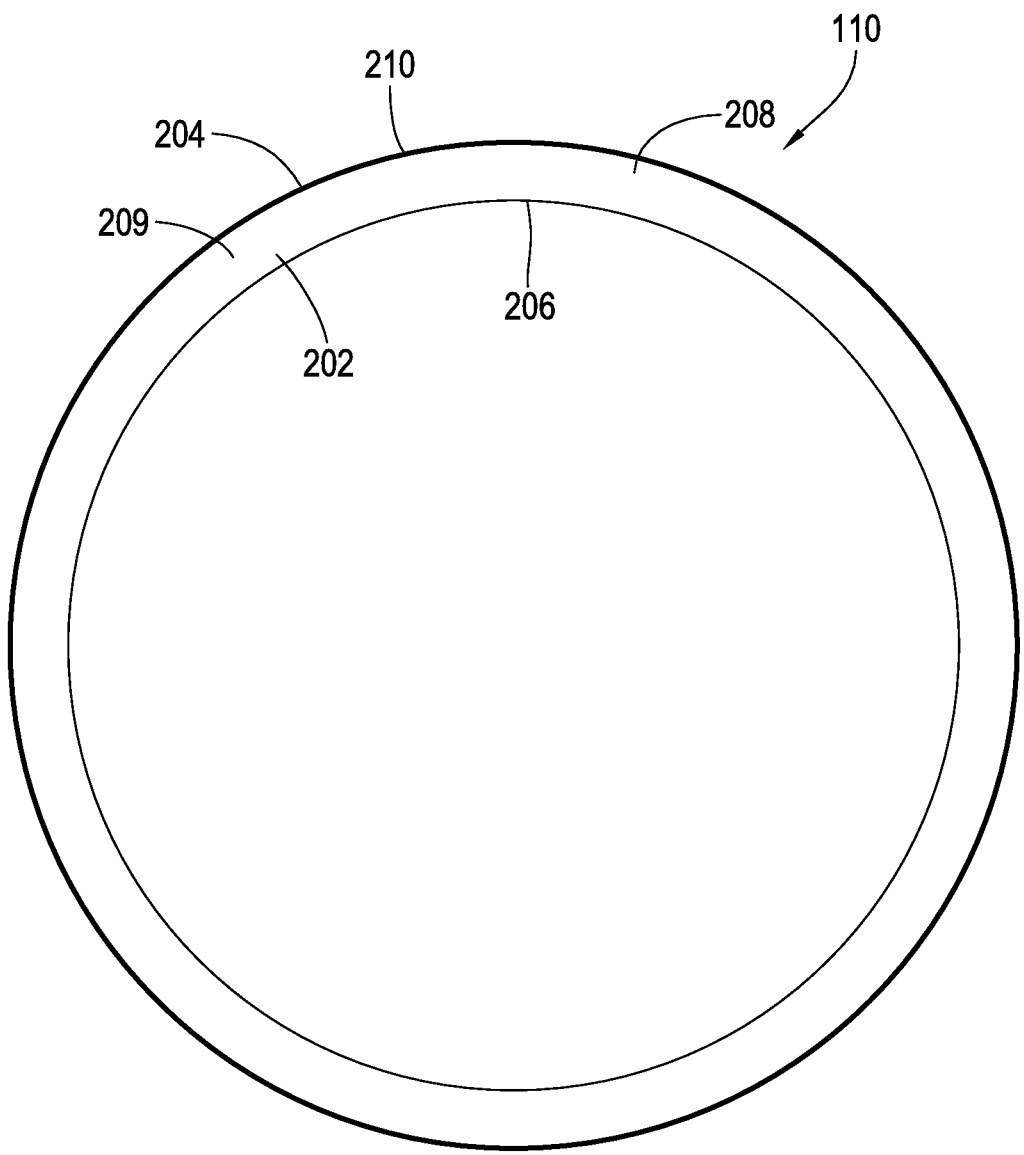
FIG. 3 is a side view of the FIG. 2 rim assembly.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

FIG. 1 shows a side view of a bicycle 100 with bicycle wheels 102 that are attached to a bicycle frame 104. Each wheel 102 includes a wheel hub 106, one or more spokes 108, a rim assembly 110, and a tire 112 that is secured to the outer radial periphery of the rim assembly 110. It should be recognized that the hubs 106 via axles are rotatably coupled to the bicycle frame 104, such as through the fork and rear dropouts. The spokes 108 extend radially outward from the hub 106 in order to connect the rim assembly 110 to the hub 106.

FIGS. 2, 3, 4, and 5 respectively show perspective, side, and, exploded views of the rim assembly 110. As should be recognized, the sides of the rim assembly 110 are mirror images of one another such that the side view of the FIG. 3 likewise illustrates the other side of the rim assembly 110. Similarly the end view in FIG. 4 illustrates the construction of the rim assembly all around the periphery of the rim assembly 110. As can be seen, the rim assembly 110 includes a rim 202 and a rim band or strip 204 that wraps around the outer radial periphery of the rim 202. In one form, the rim 202 is made of composite fiber materials, such as carbon fiber, and the rim strip 204 is made of a stretchable or elastomeric material, such as rubber and/or silicone material. The rim strip 204 is made from a polyurethane material that is extruded to form the rim strip 204, but the rim strip 204 in other examples can be made of different materials and/or manufactured in other ways, such as through a molding process. In one example, the rim strip 204 is secured to the rim 202 by being stretched around the rim 202. Alternatively or additionally, an adhesive can be used to secure the rim strip 204 to the rim 202. As depicted, the rim 202 includes a spoke face 206 where the spokes 108 of the wheel 102 are secured. From the spoke face 206, sidewalls 208 of the rim 202 extend generally radial outward to form a corresponding rim flange 209 with a leading edge 210. As can be seen, the sidewalls 208 extend on opposite sides of the rim 202 in a mirror image fashion. In the illustrated example, the pair of leading edges 210 are located at the outer periphery of the rim 202. Between the rim flanges 209, the rim 202 defines a tire channel 212 into which a portion of the rim strip 204 is received.

Figure 6:
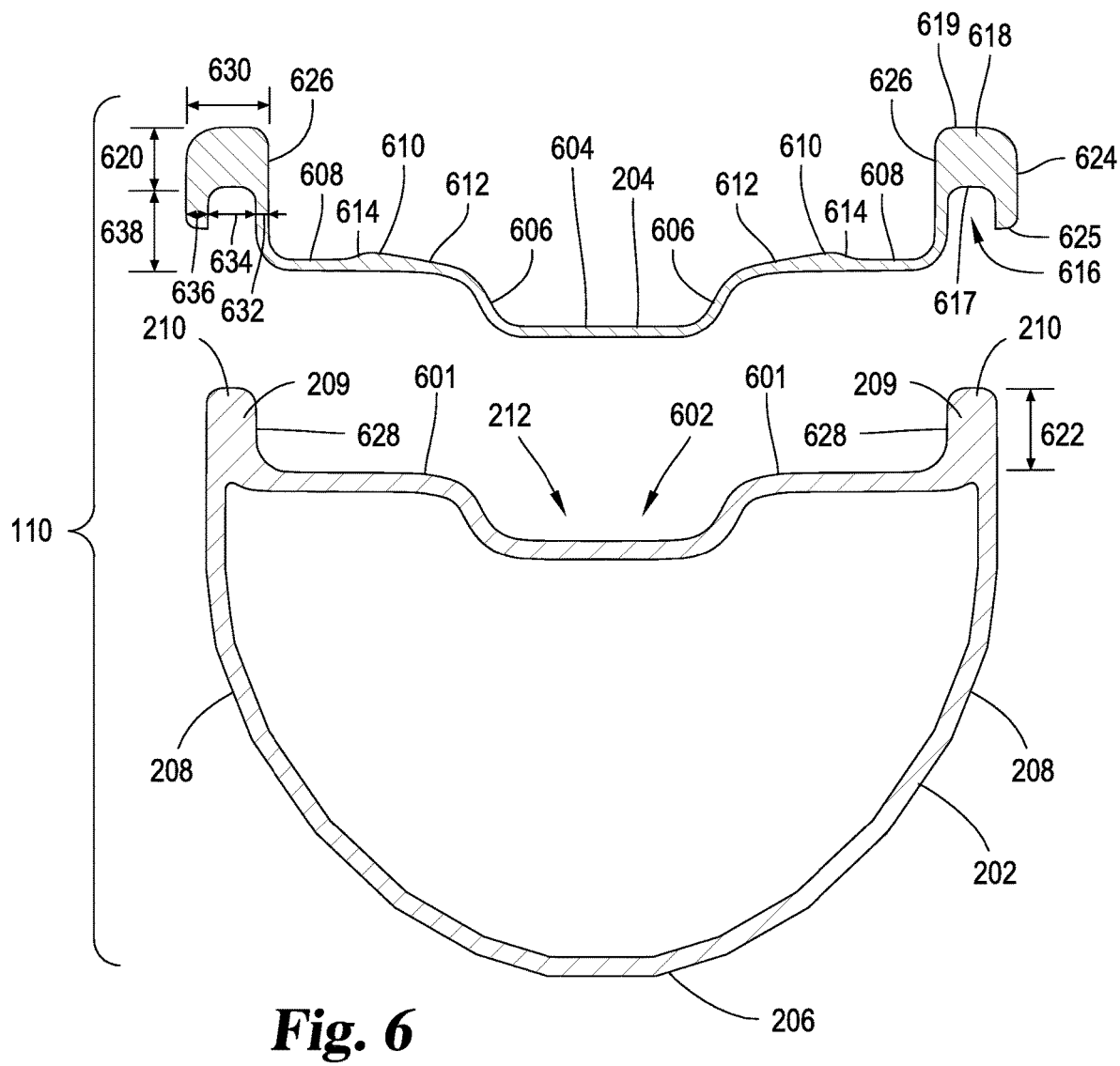
FIG. 6 is an enlarged cross-sectional, exploded view of the FIG. 2 rim assembly.

FIG. 6 shows an exploded view of the rim assembly 110. As shown, the tire channel 212 in the rim 202 has a channel surface 601 on which the tire 112 is seated when mounted to the rim 202. The channel surface 601 has a rim drop or drop center 602 that has a smaller diameter than the channel surface 601 so as to make mounting of the tire 112 easier. In the rim drop 602, the beads of the tire 112 are initially positioned so that the tire bead is able to be readily installed onto the rim 202. Since the inner diameters of the tire beads closely match the outer diameter of the channel surface 601 so as to ensure a tight seal when a tubeless tire system is inflated, the reduced diameter of the rim drop 602 provides some wiggle room for the tire 112 to move when the tire bead is lifted over the rim flanges 209 during mounting of the tire 112. As shown, the rim strip 204 includes a drop section 604 that bows towards the rim 202 so as to correspond in shape to the rim drop 602 in the rim 202. On opposing sides of the drop section 604, the rim strip 204 has transition walls 606 that are angled and curved to connect the drop section 604 to tire seating sections 608 where the tire beads are seated when the tire 112 is inflated. Between the transition walls 606 and the tire seating sections 608, the rim strip 204 has one or more safety or seating humps or bead locks 610 that are configured to aid in sealing the tire beads in the tire seating section 608. In particular, the safety humps 610 help to retain the tire beads in the seating sections 608. As shown, each safety hump 610 includes a ramp section 612 that extends towards the transition wall 606 of the drop section 604 and a retention section 614 that faces the tire seating section 608. The safety hump 610 is angled to become gradually thicker at the ramp section 612 as compared to the retention section 614 which abruptly changes in thickness to the tire seating section 608. As the tire 112 is inflated, the tire bead travels along the ramp section 612 so as to minimize any air leakage. Once the tire bead reaches the retention section 614, the tire bead pops into the tire seating section 608.

As depicted in FIG. 6, the rim strip 204 further includes rim flange channels 616 that are configured to receive corresponding rim flanges 209 of the rim 202. Each rim flange channel 616 has a leading edge contact surface 617 where the leading edge 210 of the rim 202 contacts the rim strip 204. Above the channels 616, the rim strip 204 has leading edge bumpers 618 that are thicker than the rest of the rim strip 204. Opposite the leading edge contact surface 617, the bumper 618 has a bumper end surface 619. As shown, the edges of the bumper end surface 619 are rounded so as to reduce the risk of any abrasion. The bumper 618 has a height or thickness 620 that is measured from the leading edge contact surface 617 to the bumper end surface 619, and the rim flange 209 has a height 622 as measured from the tire channel surface 601 to the leading edge 210. In one form, the thickness 620 of the bumpers 618 generally corresponds to the height 622 of the rim flange 209. In other words, the bumpers 618 double the effective height of the rim flange 209 while providing the flexibility to allow the tire to clear the flange 209. This in turn can also help simplify the design of the rim 202 as well as the associated manufacturing costs by minimizing the height 622 of the rim flanges 209 for the rim 202. The flexible or resilient nature of the bumpers 618 makes it easier to clear the tire bead over the rim flanges 209 and bumpers 618 during mounting of the tire 112. The bumpers 618 also aid in dispersing energy from any impact so as to reduce the chances of a flat. Opposing sides of the rim strip 204 each include an outer buffer 624 that further protects the rim flange 209 of the rim 202 from impacts. The outer buffer 624 has a hook end 625. Due to the high stresses experienced at the leading edges 210, the rim 202 is susceptible to damage at the rim flanges 209. The outer buffer 624 provides a cushion so as to disperse the energy from any sharp impacts at the leading edges 210 of the rim 202. Opposite buffer 624, the rim strip 204 has a channel facing wall 626 that is flat so as to correspond with a flat inner channel surface 628 of the rim flange 209.

During development of the rim assembly 110, it was discovered that certain dimensional relationships of various components of the rim strip 204 reduced the risk of tire flats as well as damage to rim 202 and rim strip 204. In one particular example, the bumpers 618 each have the bumper height 620 of about 2.70 mm and a bumper width 630 of about 5.10 mm. The channel facing wall 626 of the bumper 618 in this example has an inner wall thickness 632 of about 1.80 mm. The bumper 618 also has a rim hook width 634 of about 2.2 mm and a hook end thickness 636 of about 1.10 mm. The hook end 625 has a hook wall height 638 that is measured from the leading edge contact surface 617 to the end of the hook end 625. This hook wall height 638 is generally the same as the height 622 of the rim flange 209. In this example, the hook end 625 has a hook wall height 638 of about 3.85 mm. It was found that particular ranges of ratios between various dimensions of the rim strip components reduced risk of damage to the tire 112 and the rim assembly 110. Specifically, it was discovered that the ratio of the rim hook width 634 to bumper width 630 (i.e., rim hook width 634÷bumper width 630) ranging from 0.30 to 0.60 was acceptable and a ratio of 0.43 was more suitable. It was also found that the ratio of the inner wall thickness 632 to bumper width 630 (i.e., inner wall thickness 632÷bumper width 630) ranging from 0.20 to 0.50 was acceptable and a ratio of 0.35 was more suitable. Moreover, it was learned that the ratio of the bumper height 620 to hook wall height 638 (i.e., bumper height 620÷hook wall height 638 [or height 622]) ranging from 0.50 to 1.20 was acceptable and a ratio of 0.70 was more suitable. These dimensions and ratios can vary in other examples.

Figure 7:
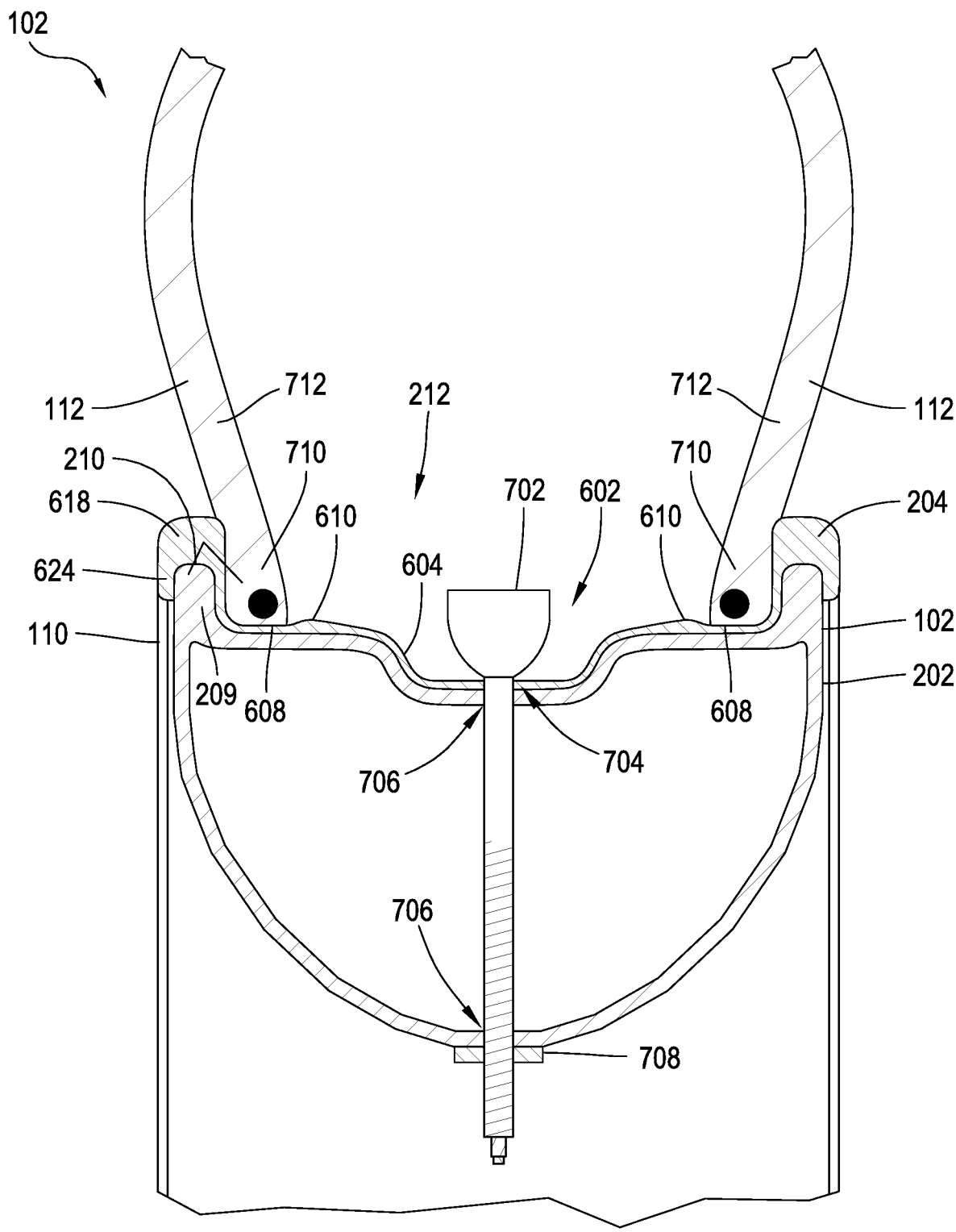
FIG. 7 is an enlarged cross-sectional view of the FIG. 1 wheels.

FIG. 7 shows a cross-sectional view of the fully inflated tire 112 when seated with the rim assembly 110. A valve assembly 702 is configured to supply air to the tire 112. In the example illustrated in FIG. 7, the tire 112 is a tubeless tire, and the valve assembly 702 is a tubeless type valve assembly. As depicted, the valve assembly 702 extends through a valve opening 704 in the rim strip 204 as well as a valve opening 706 in the rim 202. A lock ring 708 helps to threadedly secure the valve assembly 702 to the rim 202. During mounting, one of the tire beads 710 of the tire 112 are placed into the rim drop 602 of the tire channel 212. The other bead 710 is then worked into the tire channel 212. Pushing the bead 710 into the rim drop 602 helps to make the last portion of the bead 710 easily slip over the rim flanges 209 and leading edge bumper 618 of the rim 202. Both tire beads 710 are then nestled within the rim drop 602. Compressed air is then supplied to the interior of the tire 112 via a pump connected to the valve assembly 702. By being generally elastic in nature, the rim strip 204 is configured to generally maintain a seal with the tire 112 both during and after inflation. As the air pressure increases inside the tire 112, walls 712 of the tire 112 expand apart, and the tire 112 takes shape. Eventually, the tire beads 710 slide over the safety hump 610 so as to pop into place inside the tire seating section 608. When the tire 112 is fully inflated, the tire beads 710 and walls 712 press against the leading edge bumper 618 of the rim strip 204. If desired, sealant can be used to further seal the tire 112 with the rim assembly 110.

The rim strip 204 with bumpers 618 help to minimize the risk of pinch flats as well as other types of flats. Due to their nature, composite type rims, such as those illustrated in the drawings, are susceptible to catastrophic failure even after minor accidents or impacts. Since it is located in a high stress area, the leading edge 210 of the rim 202 is one location susceptible to being an origination source for cracks or even catastrophic failures. The bumpers 618 along with the buffers 624 of the rim strip 204 helps to disperse energy from any impacts and protect the rim 202 from damage, such as along the rim flange 209.

Figure 8:
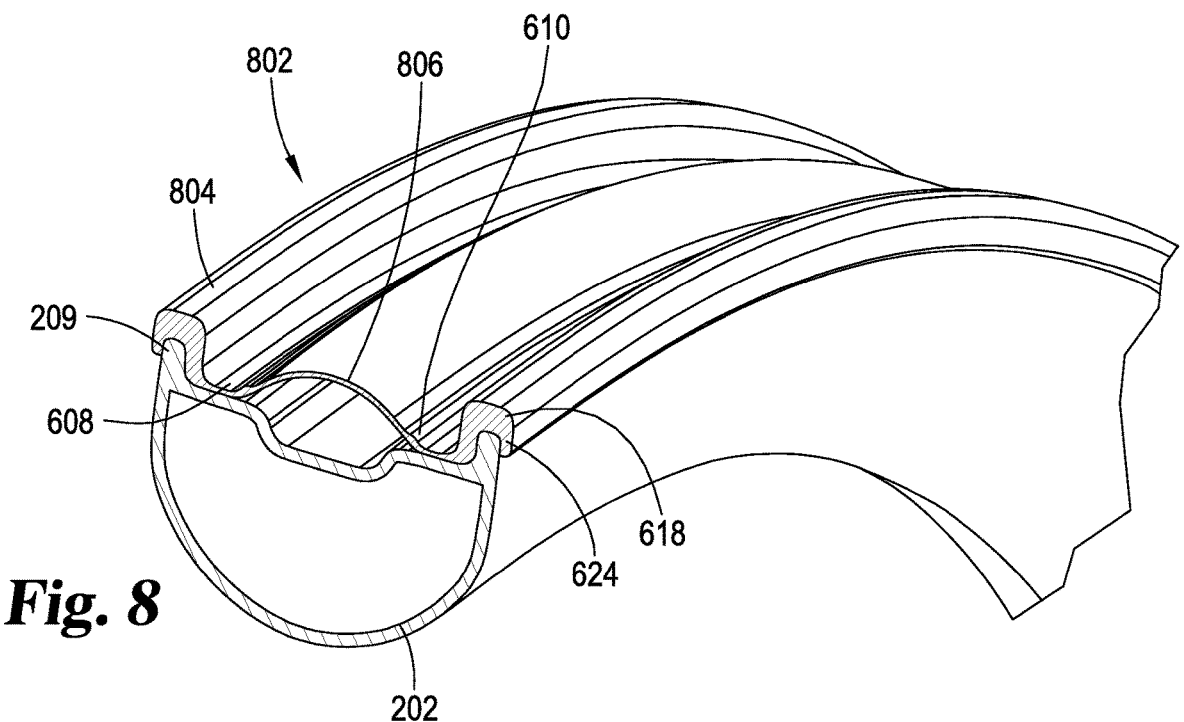
FIG. 8 is a perspective, cross-sectional view of another example of a rim assembly for use in the FIG. 1 bicycle.
Figure 9:
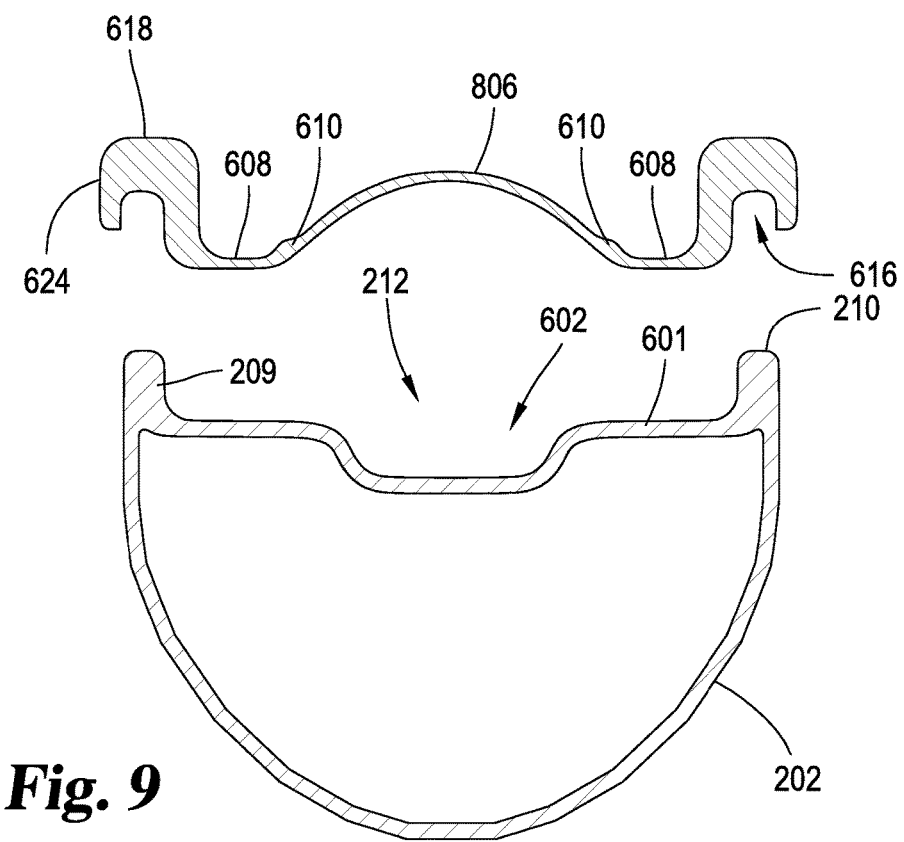
FIG. 9 is an exploded, cross-sectional view of the FIG. 8 rim assembly.

As mentioned before, most tubeless tire setups have to be inflated with a blast of air typically from a compressor or $CO_2$ inflators in order to seat the beads 710 of the tire 112. However, most conventional floor, foot, electric, and hand pumps lack sufficient pump throughput to counteract the leakage rate from the tire to create enough pressure for seating the tire. FIG. 8 shows a perspective, cross-sectional view of a rim assembly 802 that is configured to facilitate seating of a tubeless tire without the need for this blast of air or other gas. Consequently, the rim assembly 802 is able to be inflated with not only pump devices having high pump throughput, such air compressors and $CO_2$ cartridge type inflators, but with conventional low pump throughput inflators, such as conventional floor, foot, and hand pumps, as well. In the illustrated example, the rim assembly 802 includes a rim strip or band 804 wrapped around the outer periphery of the rim 202. As can be seen in FIGS. 8 and 9, the rim strip 804 shares a number of features in common with the rim strip 204 illustrated in FIGS. 2-7, such as the tire seating sections 608, safety humps 610, channels 616, bumpers 618, and buffers 624. For the sake of brevity as well as clarity, these common features will not be again discussed in detail below, but please refer to the previous discussion of these common features.

Looking at FIGS. 8 and 9, the rim strip 804 includes a pre-seating or drop seal 806 that is biased to form a seal with the tire beads 710 of the tire 112 before the tire 112 is seated in the seating sections 608 of the rim strip 804. In the illustrated example, the drop seal 806 is bowed away from the rim drop 602 in the rim 202 between both seating sections 608 as well as the safety humps or bead seats 610. Like the previous example, the rim strip 804 is made from a flexible material, such as rubber and/or silicone. The drop seal 806 is pliable and is able to be biased to press against the tire bead 710 when one or both of the tire beads are positioned over the rim drop 602 during mounting. This construction in turn helps to create and maintain a seal between the tire 112 and the rim strip 804 during inflation of the tire 112. With the drop seal 806, inflation devices having low pump throughput or capacity, like common manual air pumps, can still be used to inflate and seat tubeless tires.

Figure 10:
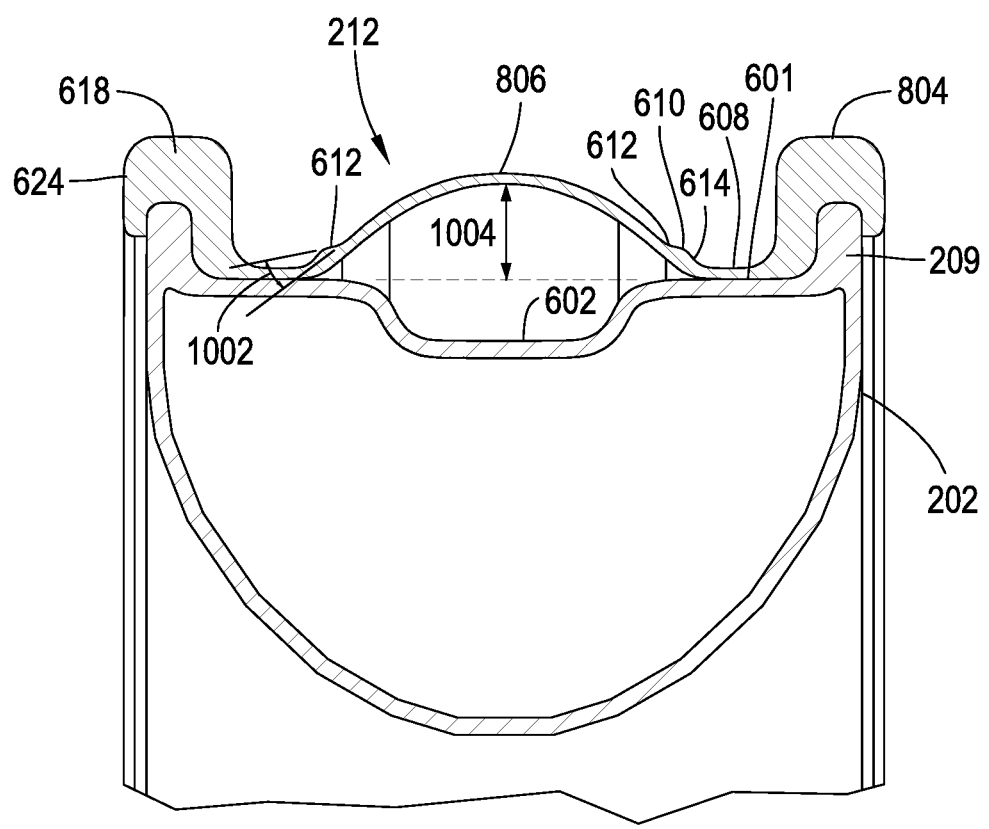
FIG. 10 is a cross-sectional view of the FIG. 8 rim assembly.

In its natural state, the drop seal 806 does not contact the rim 202, as is depicted in FIG. 10. During mounting of the tire 112, the beads 710 of the tire 112 are positioned over the rim drop 602 in the rim 202. Since it has a smaller outer diameter than the rest of the rim 202, the rim drop 602 provides a clearance gap that allows the rest of the tire bead 710 to be pulled over the bumper 618 and the rim flange 209. However, it was discovered that once the entire tire bead 710 for a given tire wall is pulled over the rim flange 209 in a conventional rim assembly, a gap is formed between the bottom of the rim drop 602 and the tire bead 710. This gap is a source for air leakage during inflation. It was found that when a tubeless tire is attempted to be inflated by conventional foot or hand pumps, the slow, low volume of air during each pump stroke simply leaks out from the gaps between the tire bead 710 and the rim 202 such that the tire 112 would never inflate and seat properly. On the other hand, air compressors are able to supply a large volume of high pressure air in a short period of time, and although some of the air leaks through the gap between the tire bead 710 and the rim 202, the bulk of the air is still trapped and can create pressure inside the tire 112 so as to inflate and seat the tire 112. As shown in FIG. 10, the ramp section 612 of the safety hump 610 is angled at an acute angle 1002 relative to the outer surface of the rim strip 804 so as to facilitate sliding of the tire bead 710 over the safety hump 610 when the drop seal 806 is biased. As shown, the drop seal 806 is at or above the tire channel surface 601 so as to be able to seal against the beads 710 of the tire 112. In one form, the drop seal 806 at its highest point has a height 1004 above the tire channel surface 601 that is at least as high as the height 622 (FIG. 6) of the rim flange 209 so that it at least extends at or above the leading edge 210, and in one particular example, the height 1004 is at least 3.85 mm.

Figure 11:
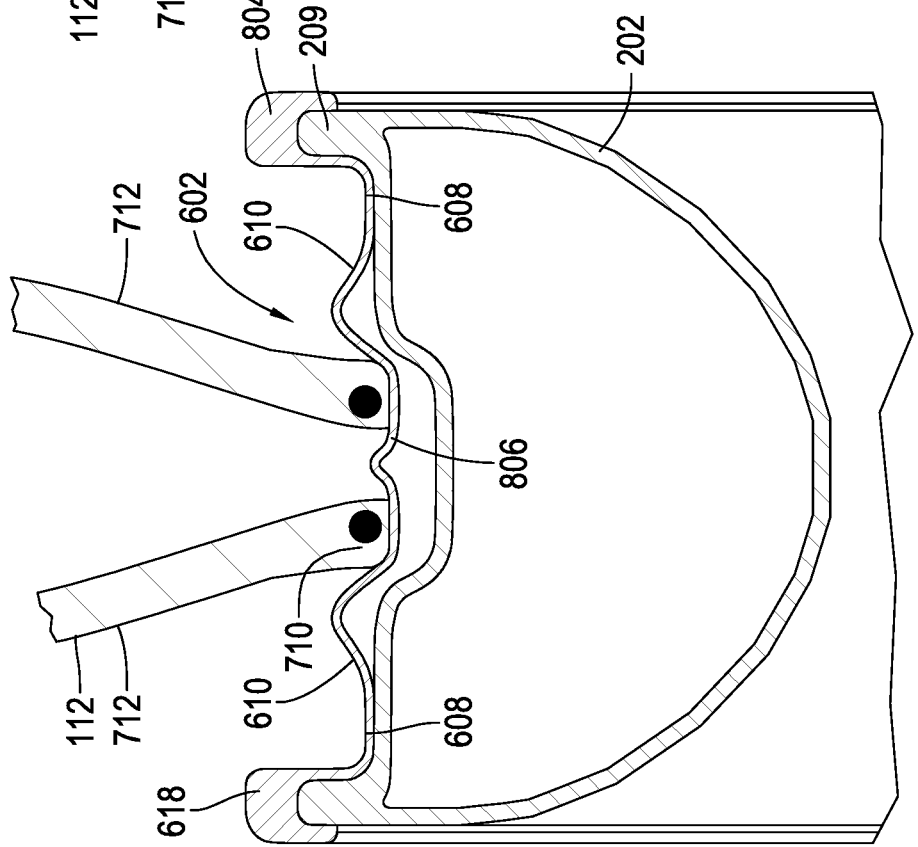
FIG. 11 is a cross-sectional view of a tire with the FIG. 8 rim assembly prior to seating of the tire.

Turning to FIG. 11, the drop seal 806 forms a seal between the bead 710 of the tire 112 and the rim strip 804 when the beads 710 are positioned in the rim drop 602. In particular, once the tire 112 is installed in the rim drop 602, the drop seal 806 is pushed down by the tire bead 710, thereby generally sealing the tire 112 with the rim strip 804. This seal allows the tubeless tire 112 to be inflated without requiring a blast of air. The rim strip material is pliable enough that when mounting the tire 112 to the rim, the drop seal 806 that is raised up collapses into the rim drop 602 of the rim 202 to allow for the tire beads to be pulled over the rim flanges. Due to the resilient nature of the drop seal 806, the drop seal 806 remains biased against the tire bead 710 which in turn maintains a seal between the tire 112 and the rim strip 804 regardless of variations in the inner diameter of the tire 112. As air is pumped or otherwise introduced into the tire 112 via the valve assembly 702 (see e.g., FIG. 7), the walls 712 spread apart as indicated by the arrows in FIG. 12. Though the seal between the tire bead 710 and the drop seal 806 might not be completely airtight in some cases such that some leakage may occur, the leakage rate from the tire 112 is considerably less such that the pump throughput from conventional pumps, like floor and hand pumps, is still sufficient to seat the tire 112.

Figure 12:
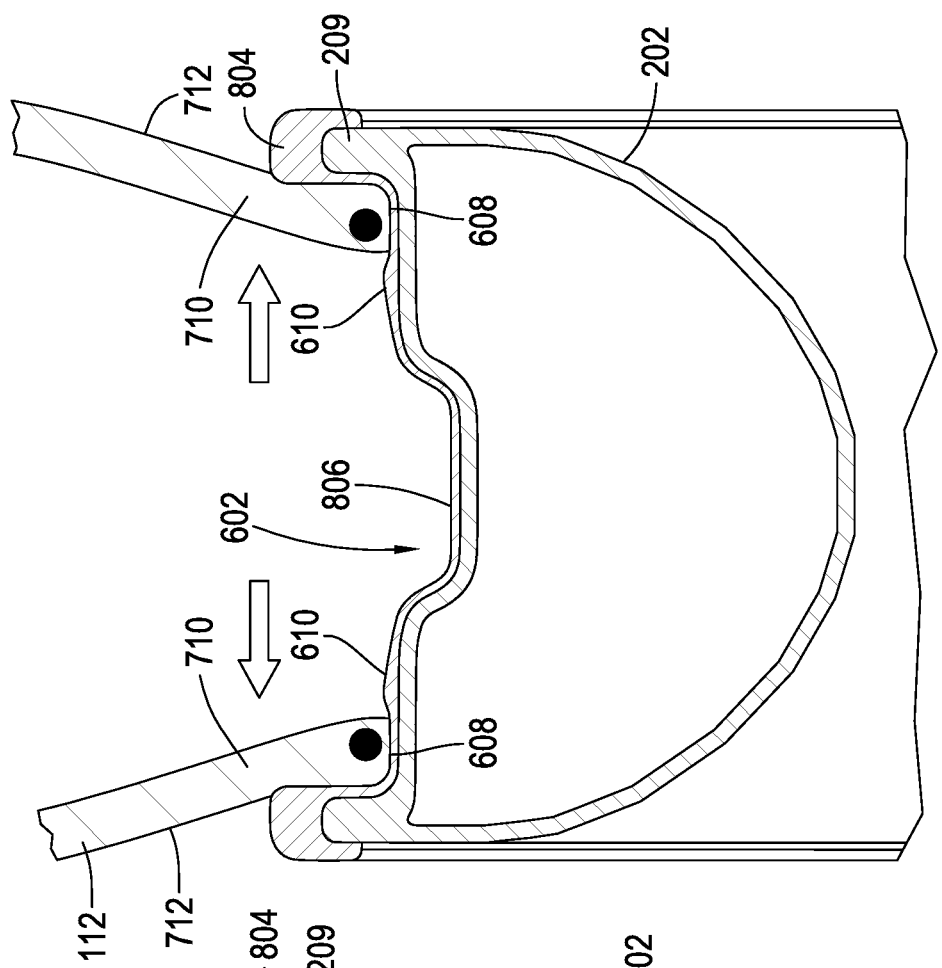
FIG. 12 is a cross-sectional view of the tire mounted to the FIG. 8 rim assembly when the tire is inflated.

The resilient nature of the drop seal 806 helps to maintain a seal between the tire beads 710 and the rim strip 804 as the walls 712 spread apart. The tire beads 710 ride along the surface of the rim strip 804 during this expansion. This ability to maintain a seal as the tire walls 712 expand allows for the tire 112 to be gradually inflated and seated with pumps having lower pump throughput as compared to compressors and $CO_2$ cartridges. Eventually, the tire beads 710 ride over the safety humps 610 on the rim strip 804 such that the tire beads 710 are seated in the tire seating sections 608 of the rim strip 804. In one example, the tire beads 710 are seated in the tire seating sections 608 of the rim strip 804 when the tire 112 is inflated to about fifteen (15) pounds per square inch (psi). Once the rim assembly 802 is pressurized to a point where the tire beads 710 are seated, the drop seal 806 of the rim strip 804 collapses and is pushed against rim drop 602 of the rim 202 by the increasing air pressure inside the tire 112 such as is depicted in FIG. 12. With the drop seal 806 pressed against the rim 202, the ability for the rim strip 804 to unseat or move within the rim 202 is reduced which in turn reduces the risk of air leakage. In one example, the drop seal 806 is configured to remain generally biased away from the rim 202, such as is shown in FIGS. 10 and 11, at pressures below where the tire beads 710 are unseated, and the drop seal 806 is configured to be pressed against the rim 202 inside the rim drop 602 (FIG. 12) at or above the pressure where the tire beads 710 are seated in the seating section 608. In one particular example, the drop seal 806 is designed to withstand pressures below 15 psi and is designed to collapse against the rim 202 at pressures at or above 15 psi. It should be recognized that these pressure limits where the trough seal collapses can be different in other examples. Although in FIG. 12 the drop seal 806 is illustrated as being pressed against the rim 202 when the tire 112 is inflated, the drop seal 806 in other examples can remain bowed upwards in the manner such as illustrated in FIGS. 8 and 10 when the tire 112 is fully inflated. Moreover, it should be recognized that the tire 112 in other examples can be mounted with one of the tire beads 710 initially seated and the other unseated but sealed with the drop seal 806.

In the illustrated examples, the rim drop 602 has a generally rectangular shape, but it can be shaped differently in other examples. For instance, the rim drop can be in the form in which the tire bed has an overall concave shape with a flat tire bead shelf on both sides of the concave section. When the rim drop 602 is configured differently, the length and/or shape of the drop seal 806 can correspond to the length and/or shape of the rim drop 602 when the tire 112 is inflated. Alternatively or additionally, the drop seal 806 can have a shape that is different from the rim drop 602 when the tire 112 is inflated.

As should be appreciated, the drop seal 806 (or other of its variations) can be incorporated into rims having a different shape than is shown. For example, the drop seal 806 can be used in a generally dish shaped tire bed. In one form, the drop in other types of rims can have a gradual concave shape with a flat bead shelf on opposite sides where the tire is seated. The rim strip can be made from one or more different types of materials. For instance, the drop seal 806 can be made from material that is more elastic or having a different stiffness than the rest of the rim strip 804. In one example, the bumpers 618 are made from a material having a higher durometer as compared to the material at and/or around the drop seal 806. In one particular example, the rim strip 804 is made from one or more materials having a hardness from Shore 80 A to 70 D.

Figure 13:
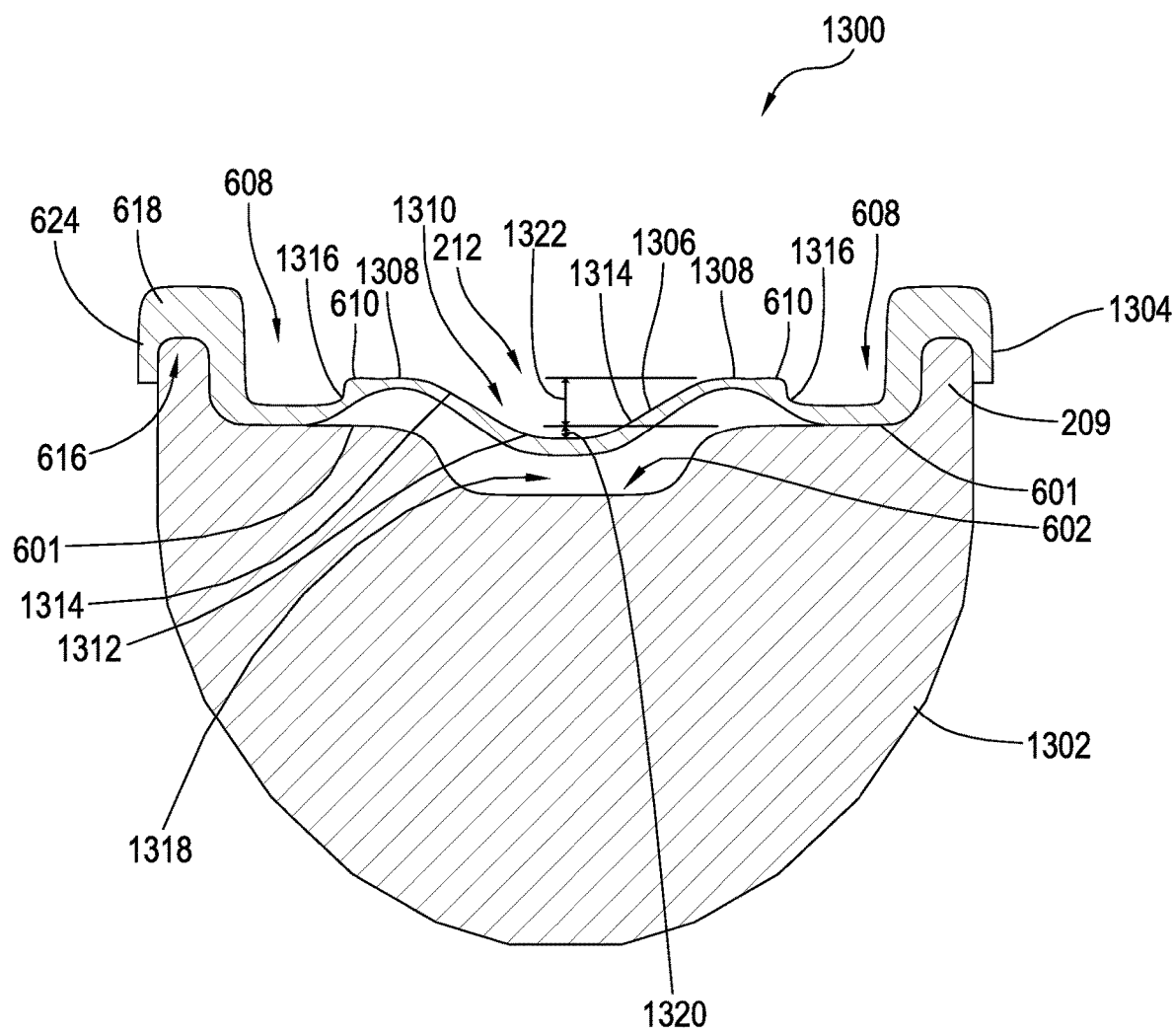
FIG. 13 is a cross-sectional view of a rim assembly according to a further example.
Figure 14:
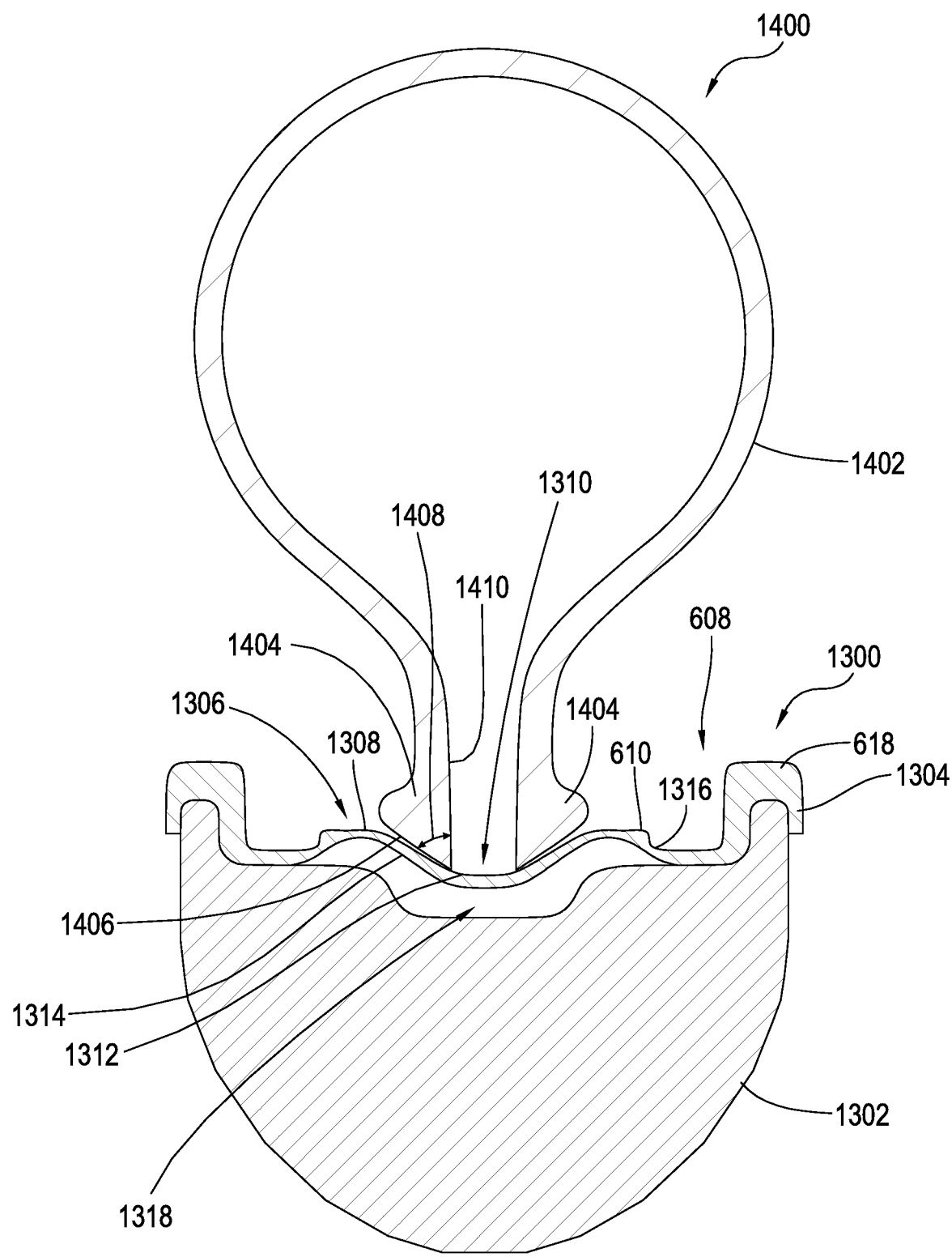
FIG. 14 is a cross-sectional view of a tire with the FIG. 13 rim assembly prior to seating of the tire.
Figure 15:
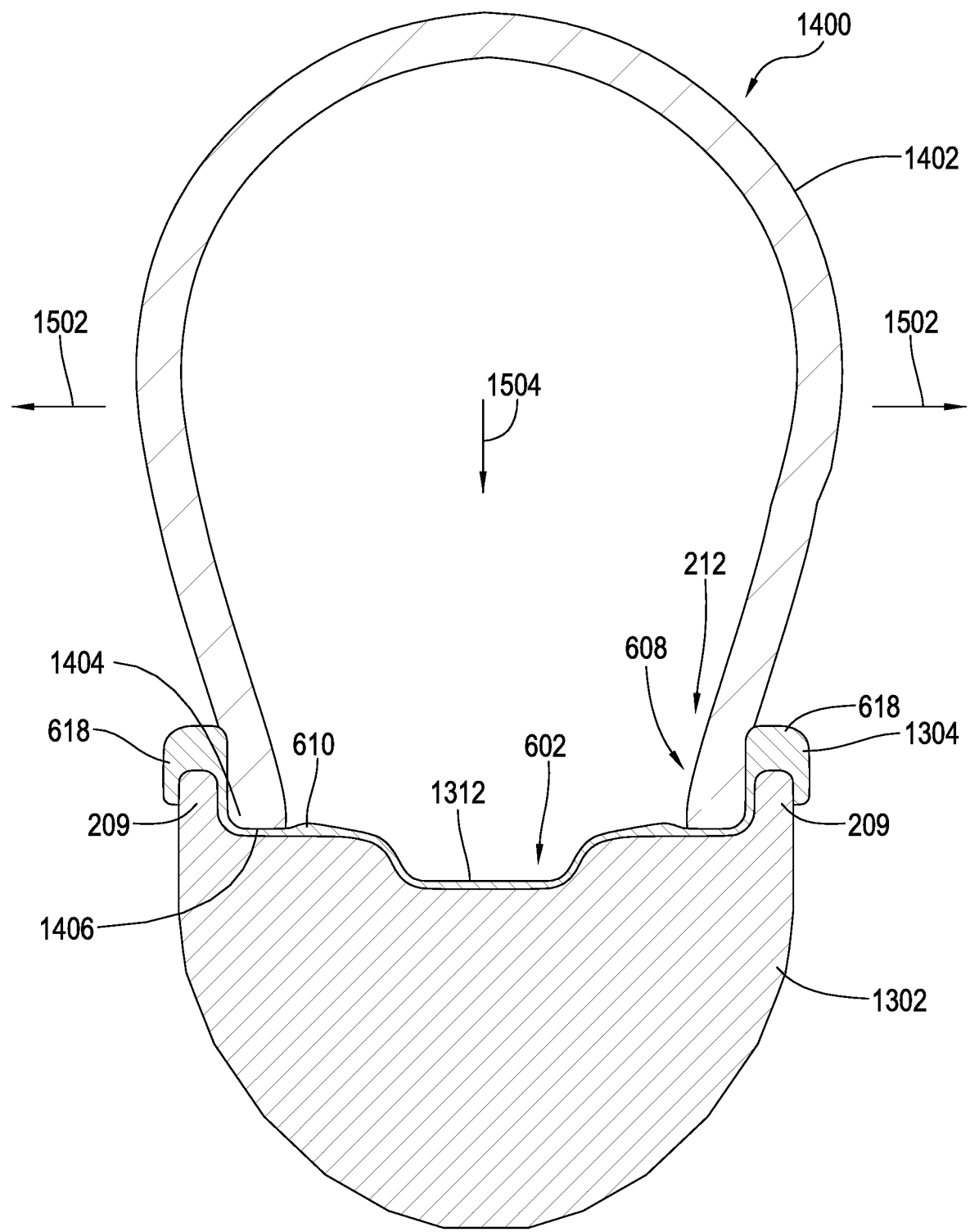
FIG. 15 is a cross-sectional view of the tire mounted to the FIG. 13 rim assembly when the tire is inflated.

FIGS. 13, 14, and 15 show another variation of the design shown in FIGS. 8-12. As shown, a rim assembly 1300 includes a rim 1302 and a rim strip or band 1304 wrapped around the outer periphery of the rim 1302. Like before, the rim 1302 has rim flanges 209. The rim 1302 further has the channel surface 601 with the rim drop or drop center 602. Again, the rim drop 602 has a smaller diameter than the channel surface 601 so as to make mounting of the tire 112 easier. Between the rim flanges 209, the rim 202 defines the tire channel 212 into which a portion of the rim strip 1304 is received. As can be seen in FIG. 13, the rim strip 1304 shares a number of features in common with the rim strips 204, 804 illustrated in FIGS. 2-12, such as the tire seating sections 608, bead locks 610, channels 616, bumpers 618, and buffers 624 as well as the previously discussed dimensions and dimensional relationships. For the sake of brevity as well as clarity, these common features and dimensional relationships will not be again discussed in detail below, but please refer to the previous discussion of these common features and dimensional relationships.

During further development, it was discovered that the single, relatively large, drop seal 806, such as shown for example in FIGS. 8-11, can interfere with the installation of the tire. The rim strip 1304 in FIG. 13 includes a pre-seating or drop seal section 1306 with a unique double-hump design. In particular, the drop seal section 1306 includes opposing bowed portions or strip humps 1308 with a strip drop channel 1310 located in between the strip humps 1308. At the strip drop channel 1310, the rim strip 1304 has a drop channel surface 1312 that is relatively flat. As can be seen, the drop channel surface 1312 extends generally parallel to the surface of the rim drop 602 of the rim 1302. From the drop channel surface 1312, tire bead engagement sections 1314 extend to form the strip humps 1308. The tire bead engagement sections 1314 extend transversely to the drop channel surface 1312. In the depicted example, each tire bead engagement section 1314 extends at an obtuse angle relative to the drop channel surface 1312. The strip humps 1308 from the tire bead engagement sections 1314 bow to the bead locks 610. Between the tire seating sections 608 and the bead locks 610, the rim strip 1304 has hinge portions 1316 where the drop seal section 1306 bends away from the channel surface 601 of the rim 1302 to form a gap 1318 between the rim 1302 and the drop seal section 1306 of the rim strip 1304.

FIG. 13 shows the state of the rim strip 1304 on the rim 1302 before a tire is installed. In its natural state, the drop seal section 1306 does not contact the rim 1302. The drop channel surface 1312 extends below the channel surface 601 of the rim 1302 and into the rim drop 602 by a drop distance 1320. In contrast, the strip humps 1308 extend above the channel surface 601 by a hump height 1322 at their highest location. Like the previous example, the rim strip 1304 is made from a flexible material, such as rubber and/or silicone. The drop seal section 1306 is pliable, and the strip humps 1308 are able to be biased to press against the tire bead when one or both of the tire beads are positioned over the rim drop 602 during mounting. This construction in turn helps to create and maintain a seal between the tire and the rim strip 1304 during inflation of the tire. With this dual-hump design of rim strip 1304, inflation devices having low pump throughput or capacity, like common manual air pumps, can still be used to inflate and seat tubeless tires.

FIG. 14 shows a cross-sectional view of a tire rim strip assembly 1400 before inflation of a tire 1402. As shown, the tire 1402 is installed over the rim 1302 and rim strip 1304. To install the tire 1402, tire beads 1404 of the tire 1402 are pulled over one or both of the leading edge bumpers 618 of the rim strip 1304. When the tire beads 1404 are pulled over, the leading edge bumpers 618 can be deformed, but the leading edge bumpers 618 spring back to their initial shape after the tire beads 1404 clear the leading edge bumpers 618. The rim strip material is pliable enough that when mounting the tire 1402 to the rim 1302, a portion of the drop seal section 1306 can collapse into the rim drop 602 of the rim 202 to allow for the tire beads 1404 to be pulled over the rim flanges. Since it has a smaller outer diameter than the rest of the rim 202, the rim drop 602 provides a clearance gap that allows the rest of the tire bead 1404 to be pulled over the bumper 618 and the rim flange 209. The strip drop channel 1310 in the drop seal section 1306 of the rim strip 1304 helps to hold in place or otherwise center the tire bead 1404 while the other tire bead 1404 is pulled over the leading edge bumpers. After clearing the leading edge bumpers 618, the tire beads 1404 of the tire 1402 are generally positioned over the rim drop 602 in the rim 202. Once both tire beads 1404 are pulled over, the strip drop channel 1310 helps to center the tire beads 1404 over the rim drop 602. As should be recognized, the double hump design of the drop seal section 1306 helps to minimize interference with the installation of the tire 1402 over the rim assembly 1300.

Each tire bead 1404 has a bead edge 1406 that contacts the rim strip 1304. The edges 1406 form an angle 1408 that is an acute angle (i.e., less than 90 degrees) relative to an inner surface 1410 of the tire 1402. Having the bead edges 1406 angled in such a manner facilitates the bead engagement sections 1314 of the rim strip 1304 sealing against the tire bead 1404 even as the tire beads 1404 move laterally towards the tire seating sections 608 during inflation. As can be seen in FIG. 14, with the tire beads 1404 received in the strip drop channel 1310, the rim strip 1304 has the same general initial shape as was shown in FIG. 13. Generally speaking, the tire 1402 does not initially alter the shape or arrangement of the rim strip 1304 at this configuration. For instance, the drop seal section 1306 remains biased away from the rim 1302 starting at the hinge portions 1316 so as to maintain the gap 1318 between the drop seal section 1306 and the rim 1302. As air is pumped or otherwise introduced into the tire 1402 via the valve assembly 702 (see e.g., FIG. 7) to inflate the tire 1402, the air pressure urges the tire beads 1404 outward laterally toward the rim flanges 209 and leading edge bumpers 618, as is indicated by lateral arrows 1502 in FIG. 15. The resilient nature of the drop seal section 1306 helps to maintain a seal between the tire beads 1404 and the rim strip 1304. The tire beads 1404 ride along the surface of the rim strip 1304 during this expansion. When the tire beads 1404 move laterally, the double strip humps 1308 are angled to remain in biased sealed contact with the bead edges 1406 of the tire 1402 so as to maintain the seal between the rim strip 1304 and the tire beads 1404. A seal is created between the angled bead engagement sections 1314 of the strip humps 1308 and the angled bead edges 1406 as the bead edges 1406 slide along the rim strip 1304.

This seal allows the tubeless tire 112 to be inflated without requiring a blast of air. In other words, this configuration allows a user to inflate the tire 1402 with a floor mounted manual pump if desired. Though the seal between the tire bead 710 and the drop seal 806 might not be completely airtight in some cases such that some leakage may occur, the leakage rate from the tire 1402 is considerably less such that the pump throughput from conventional pumps, like floor and hand pumps, is still sufficient to seat the tire 112. The air pressure also urges the double strip humps 1308 in a downward direction 1504 so as to conform to the outer surface of the tire channel 212 in the rim 1302.

Again, this ability to maintain a seal between the rim strip 1304 and tire beads 1404 as the tire beads 1404 move laterally during inflation allows for the tire 1402 to be gradually inflated and seated with pumps having lower pump throughput as compared to compressors and $CO_2$ cartridges. Eventually, the tire beads 1404 ride over the safety humps 610 on the rim strip 1304 such that the tire beads 1404 are seated in the tire seating sections 608 of the rim strip 1304, as is depicted in FIG. 15. In one example, the tire beads 1404 are seated in the tire seating sections 608 of the rim strip 1304 when the tire 1402 is inflated to about fifteen (15) pounds per square inch (psi). Once the rim assembly 1400 is pressurized to a point where the tire beads 1404 are seated, the drop seal section 1306 of the rim strip 1304 collapses and is pushed against rim drop 602 of the rim 1302 by the increasing air pressure inside the tire 1402. During this collapse the rim strip 1304 tends to bend at the hinge portions 1316 as well as elsewhere along the drop seal section 1306. In other words, as the tire 1402 is inflated, the drop seal section 1306 of the rim strip 1304 moves from a first, uncollapsed position, which is shown in FIG. 14, to a second collapsed position that is depicted in FIG. 15. With the drop seal section 1306 pressed against the rim 1302, the ability for the rim strip 1304 to unseat or move within the rim 1302 is reduced which in turn reduces the risk of air leakage. The bead locks 610 then help to secure the tire beads 1404 in position once the tire 1402 is inflated. If the tire 1402 subsequently loses air pressure, the bead locks 610 generally retain the tire beads 1404 toward the rim flanges 209. The drop seal section 1306 will tend to move back upward to form the gap 1318 between the rim 1302 and the drop seal section 1306 with the loss of air pressure. During air pressure loss, the double strip humps 1308 further aid in retaining the tire beads 1404 within the tire seating section 608 which in turn helps to reduce damage to the rim 1302 and/or tire 1402 such as with a flat tire.

As should be appreciated, the double hump drop seal section 1306 (or other of its variations) can be incorporated into rims having a different shape than is shown. For example, the drop seal section 1306 can be used in a generally dish shaped tire bed. In one form, the drop in other types of rims can have a gradual concave shape with a flat bead shelf on opposite sides where the tire is seated. The rim strip 1304 can be made from one or more different types of materials. For instance, the drop seal section 1306 can be made from material that is more elastic or having a different stiffness than the rest of the rim strip 1304. In one example, the bumpers 618 are made from a material having a higher durometer as compared to the material at and/or around the drop seal section 1306. In one particular example, the rim strip 1304 is made from one or more materials having a hardness from Shore 80 A to 70 D.

GLOSSARY OF DEFINITIONS AND ALTERNATIVES

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's and Random House dictionaries. As used in the specification and claims, the following definitions apply to the following terms or common variations thereof (e.g., singular/plural forms, past/present tenses, etc.):

"Bicycle" is used in the broader or more generic sense to generally refer to a human powered land vehicle that includes one or more wheels. The term "bicycle" can refer to a vehicle having two wheels, but it also refers to vehicles having one wheel (i.e., a unicycle), three wheels (i.e., a tricycle), or even more wheels.

"Carbon Fiber Material" refers generally to a type of fiber reinforced material that includes, but is not limited to, a material of thin, strong crystalline filaments of carbon, used as a strengthening material, such as in resins and ceramics. For example, carbon fiber materials include strong lightweight synthetic fibers made especially by carbonizing a fiber at high temperatures.

"Composite Material" refers generally to any material including a fiber reinforcement and an encapsulating matrix. A fiber (a fiber or fiber tow typically includes a bundle of filaments) is generally considered to be continuous if the fiber extends from one edge of a ply of material to another edge, most often the opposing edge. While all fibers in a composite material need not be continuous, a substantial majority of the fibers will be continuous in some examples.

"Drop Seal" or "Pre-seating Seal" generally refers to the part or section of the rim strip that is normally biased away from the rim to contact the tire beads of the tire at a position at least over the rim drop during mounting of the tire. The drop seal is normally configured to seal against the tire beads during at least part of the tire inflation process. The drop seal in one example can have arched profile, but can have different profiles in other examples, such as rectangular, cylindrical, triangular, symmetrical, or asymmetrical profiles, to name just a few examples. The rim strip can include one or more drop seals. In one example, the drop seal is part of the rim strip, but it should be recognized that the drop seal can be incorporated into other structures besides rim strips and/or can be a stand-alone component.

"Leading Edge" or "Rim Edge" generally refers to one of two edges of the rim that holds the sidewall of the tire and forms part of the wheel bed securing the tire to the rim. The leading edge may take the form of a flange in the case of traditional "clincher" type wheels or may take the shape of a shallow lip that forms a cusp where the tire lies for tubular or sew-up rims. The leading edge can include a chamfer, bevel, and/or other surface contouring that transitions or blends the leading edge into the sidewall of the rim. When described and/or claimed herein, the leading edge should be considered to end after this chamfer, bevel, and/or contouring that transitions into the sidewall of the rim.

"Leakage Rate" or "Leakage Throughput" generally refers to the quantity of gas lost over a unit of time, and is measured in units of pressure·volume/unit time. It can be represented by the following equation:

$$Q_L = \Delta P \times V \div \Delta t \qquad \text{Equation 1}$$

where:
$Q_L$=Leakage Rate;
$\Delta P$=Pressure change during measurement period;
V=Volume; and
$\Delta t$=Measurement time period.

"Pump Speed" or "Pumping Speed" generally refers to the volume flow rate of a pump at the outlet (or inlet for vacuum pumps), often measured in volume per unit of time. In other words, the pump speed is the transportation capacity which the pump makes available within a specific unit of time. It can be represented by the following equation:

$$S = V \div t \qquad \text{Equation 2}$$

where:
S=Pump Speed;
V=Volume; and
t=time.

"Pump Throughput" or "Pump Capacity" generally refers to the pump speed multiplied by the gas pressure at the outlet (or inlet for vacuum pumps), and is measured in units of pressure·volume/unit time. In other words, the pump throughput represents the quantity of gas moved by the pump over a unit of time. It can be represented by the following equation:

$$Q = P \times V \div t \qquad \text{Equation 3}$$

where:
Q=Pump Throughput;
P=Pressure;
V=Volume; and
t=time.

It can be simplified in terms of Pump Speed with the following equation:

$$Q = P \times S \qquad \text{Equation 4}$$

where:
Q=Pump Throughput;
P=Pressure; and
S=Pump Speed.

"Rim" generally refers to the outer portion of a wheel assembly that holds the tire (which represents the leading edge of an airfoil shape of the rim) on the outer surface and spokes through spoke holes of an inner surface (which then becomes the trailing edge of the airfoil shape). By way of non-limiting examples, the rim can include a clincher type rim or a tubular/sew-up type rim.

"Rim Channel" or "Tire Channel" generally refers a groove or trough in a rim that is defined between the rim flanges or leading edges of the rim in which the tire is mounted.

"Rim Drop" or "Drop Center" generally refers to a change (drop) in the rim profile between the rim flanges, such as in the form of a valley or trough, in which the bead of a tire is placed during the mounting process. At the rim drop, the rim has a reduced diameter that facilitates the tire being mounted on the rim. The rim drop in one example is located halfway between the rim flanges, but the rim drop can be located at other locations, such as off center from the rim flanges. Rims can includes more than one rim drop. Alternatively or additionally, the rim drop can be in the form of a gradual drop in which the tire bed has an overall concave shape with a flat tire bead shelf on both sides of the concave section.

"Rim Flange" generally refers a projecting edge or rib that extends radially outward from the rim. A rim normally, but not always, includes a pair of flanges that define a tire channel in which a tire is mounted, such as in the case of traditional clincher type rims. In this example, the rim flange is used to secure the tire and support the sidewall of the tire when mounted to the rim. The rim flange can have or form one of the leading edges of the rim. The rim flange can be straight or include hooks for securing the tire bead.

"Rim Flange Bumper" generally refers a portion of a rim strip that covers a rim flange to absorb the forces from an impact. The rim flange bumper in one example is made of a thick resilient material configured to protect the rim flange as well as the rest of the rim.

"Rim Strip" generally refers to a generally cylindrical band that covers the rim channels and rim flanges of the rim. By way of non-limiting examples, the rim strip typically, but not always, is at least partially made of an elastic material, such as natural rubber, synthetic rubber, polyurethane, and the like.

"Sidewall" generally refers to the surface or side that extends from the leading edge to the spoke when describing a rim. For a tire, the term "sidewall" generally refers to the side or surface between the tread shoulder and the tire or rim bead.

"Spoke Face" generally refers to the surface of the rim where a spoke of a wheel extends for attachment to the hub.

"Tire" generally refers to a cushion that fits around a rim. Usually, the tire is partially or fully made of rubber (natural or synthetic) and/or other elastic materials. By way of a nonlimiting example, the tire can include a pneumatic tire that contains compressed a gas, such as air, nitrogen, and/or carbon dioxide. The tire typically, but not always, includes a tire bead, tire sidewalls, and a tread. The tire can include an inner tube or be a tubeless type tire that does not have an inner tube. For tubeless tires, a sealant can optionally be used to form a generally airtight seal with the rim. While tubeless type tires normally do not have an inner tube, inner tubes can be use to inflate tubeless tires on a temporary basis, such as to provide a temporary field repair after a flat tire. The tire can be in the form of a tubular (or sew-up) type tire or a clincher type tire. The tire, rim, and/or inner tube can include a valve, such as Schrader, Presta, or Woods type valves, for inflating the tire.

"Wheel" generally refers to an outer circular rim that holds the tire along with the spoke and hub assembly; however, based on the embodiment described, a wheel and rim may be used herein interchangeably.

It should be noted that the singular forms "a", "an", "the", and the like as used in the description and/or the claims include the plural forms unless expressly discussed otherwise. For example, if the specification and/or claims refer to "a device" or "the device", it includes one or more of such devices.

It should be noted that directional terms, such as "up", "down", "top" "bottom", "fore", "aft", "lateral", "longitudinal", "radial", "circumferential", etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. An apparatus, comprising:
a bicycle rim defining a tire channel with a rim drop;
a rim strip coupled to the tire channel of the rim, the rim strip having a drop seal section spanning across the rim drop, wherein the drop seal section includes
at least two strip humps, and
a strip drop channel disposed between the strip humps, wherein the strip drop channel is located at the rim drop;
wherein the drop seal section has an uninflated position where at least part of the drop seal section is biased away from the tire channel to form a gap between the drop seal section and the bicycle rim;
wherein the rim strip is configured to be disposed between one or more tire beads and the rim; wherein the strip drop channel is configured to receive the one or more tire beads with the one or more tire beads pressing against the respective strip humps to seal with the respective strip humps when the drop seal section is in the uninflated position; wherein the tire channel has a channel surface; the rim drop extends below the channel surface; the strip drop channel has a drop channel surface that extends below the channel surface inside of the rim drop when in the uninflated position; the strip humps are bowed above the channel surface when in the uninflated position; and wherein the rim strip includes bead locks; and the strip humps are disposed between the bead locks and the strip drop channel.

2. The apparatus of claim 1, further comprising a tire coupled to the bicycle rim, the tire having the one or more tire beads.

3. The apparatus of claim 2, wherein:
the drop seal section has tire bead engagement sections extending at an obtuse angle relative to the drop channel surface from the drop channel surface to the strip humps;
the one or more tire beads each have a bead edge contacting the tire bead engagement sections when the drop seal section is in the uninflated position; and
the bead edges are angled at an acute angle relative to an inner wall of the tire.

4. The apparatus of claim 2, wherein the rim strip has hinge portions at the bead locks where the rim strip is biased to raise the drop seal section to form the gap when at the uninflated position.

5. The apparatus of claim 4, wherein:
the rim has at least two rim flanges that in part define the tire channel;
the rim strip has leading edge bumpers covering the rim flanges;
the rim strip has tire seating sections located between the leading edge bumpers and the bead locks; and
the tire seating sections are configured to receive the one or more tire beads.

6. The apparatus of claim 5, wherein the tire and the rim strip have an inflated position when the tire is inflated where the one or more tire beads are received in the seating sections of the rim strip and the drop seal section of the rim strip presses against the rim.

7. The apparatus of claim 6, wherein the strip humps are biased to bow away from the rim to retain the one or more tire beads in place as air pressure is lost from the tire.

8. The apparatus of claim 2, wherein the strip humps are biased to bow away from the rim to retain the one or more tire beads in place as air pressure is lost from the tire.

9. The apparatus of claim 1, wherein the rim strip has hinge portions at the bead locks where the rim strip is biased to raise the drop seal section to form the gap when at the uninflated position.

10. The apparatus of claim 1, wherein:
the rim has at least two rim flanges that in part define the tire channel;
the rim strip has leading edge bumpers covering the rim flanges; and
the rim strip has tire seating sections located between the leading edge bumpers and the bead locks.

11. A method, comprising:
tucking at least two tire beads of a tire between at least two strip humps of a rim strip coupled to a bicycle rim, wherein the bicycle rim has a rim drop, wherein said tucking positions the tire beads over the rim drop, wherein the rim strip has at least two tire seating sections with the strip humps located in between the tire seating sections;
inflating the tire to cause the tire beads to slide apart along the strip humps in a lateral direction away from the rim drop, wherein during said inflating the strip humps are biased away from the bicycle rim to seal the strip humps against the tire beads;
seating the tire beads of the tire in seating sections of the rim strip as a result of said inflating; and
collapsing the strip humps against the bicycle rim during said inflating.

12. The method of claim 11, wherein said inflating includes pumping air into the tire manually with a manual air pump.

13. The method of claim 11, further comprising:
wherein the rim has at least two rim flanges;
wherein the rim strip has leading edge bumpers covering the rim flanges; and
clearing the tire beads over at least one of the rim flanges by deforming the leading edge bumpers before said tucking.

14. The method of claim 11, wherein:
the bicycle rim has a tire channel with a channel surface;
the rim drop extends below the channel surface;
the rim strip has a strip drop channel;
the strip drop channel has a drop channel surface that extends below the channel surface inside of the rim drop before said inflating; and
the humps are bowed above the channel surface before said inflating.

15. The method of claim 11, further comprising:
biasing the strip humps away from the bicycle rim to retain the tire beads in place as air pressure is lost from the tire.

16. An apparatus, comprising:
a bicycle rim defining a tire channel with a rim drop;
a rim strip coupled to the tire channel of the rim, the rim strip having a drop seal section spanning across the rim drop, wherein the drop seal section includes
at least two strip humps, and
a strip drop channel disposed between the strip humps, wherein the strip drop channel is located at the rim drop;

wherein the drop seal section has an uninflated position where at least part of the drop seal section is biased away from the tire channel to form a gap between the drop seal section and the bicycle rim;
wherein the tire channel has a channel surface;
wherein the rim drop extends below the channel surface;
wherein the strip drop channel has a drop channel surface that extends below the channel surface inside of the rim drop when in the uninflated position;
wherein the humps are bowed above the channel surface when in the uninflated position; and
wherein the drop seal section has an inflated position where the at least part of the drop seal section contacts the drop channel surface; and wherein the strip humps are configured to be disposed axially interior of the rim relative to one or more tire beads.

17. The apparatus of claim 16, further comprising:
a tire coupled to the bicycle rim, the tire having the one or more tire beads;
wherein the rim strip is disposed between the one or more tire beads and the rim; and
wherein the one or more tire beads are received in the strip drop channel with the one or more tire beads pressing against the respective strip humps to seal with the respective strip humps when the drop seal section is in the uninflated position.

18. The apparatus of claim 16, wherein:
the rim strip includes bead locks; and
the strip humps are disposed between the bead locks and the strip drop channel.

19. An apparatus, comprising:
a bicycle rim defining a tire channel with a rim drop;
a rim strip coupled to the tire channel of the rim, the rim strip having a drop seal section spanning across the rim drop, wherein the drop seal section includes
at least two strip humps, and
a strip drop channel disposed between the strip humps, wherein the strip drop channel is located at the rim drop;
wherein the drop seal section has an uninflated position where at least part of the drop seal section is biased away from the tire channel to form a gap between the drop seal section and the bicycle rim;
wherein the rim strip includes bead locks;
wherein the strip humps are disposed between the bead locks and the strip drop channel; and
wherein the rim strip has hinge portions at the bead locks that extend in an upright manner where the rim strip is biased to raise the drop seal section to form the gap when at the uninflated position and press against the rim in an inflated position.

20. The apparatus of claim 19, further comprising:
a tire coupled to the bicycle rim, the tire having one or more tire beads;
wherein the rim strip is disposed between the one or more tire beads and the rim; and
wherein the one or more tire beads are received in the strip drop channel with the one or more tire beads pressing against the respective strip humps to seal with the respective strip humps when the drop seal section is in the uninflated position.

* * * * *